(12) United States Patent
Niimura

(10) Patent No.: US 11,855,548 B2
(45) Date of Patent: Dec. 26, 2023

(54) POWER CONVERSION DEVICE AND POWER CONVERSION CONTROL DEVICE

(71) Applicant: TOSHIBA MITSUBISHI-ELECTRIC INDUSTRIAL SYSTEMS CORPORATION, Chuo-ku (JP)

(72) Inventor: Naoto Niimura, Tokyo (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 357 days.

(21) Appl. No.: 17/419,960

(22) PCT Filed: Jun. 4, 2019

(86) PCT No.: PCT/JP2019/022176
§ 371 (c)(1),
(2) Date: Jun. 30, 2021

(87) PCT Pub. No.: WO2020/245916
PCT Pub. Date: Dec. 10, 2020

(65) Prior Publication Data
US 2022/0085729 A1     Mar. 17, 2022

(51) Int. Cl.
| H02M 3/158 | (2006.01) |
| H02M 5/458 | (2006.01) |
| H02P 27/06 | (2006.01) |

(52) U.S. Cl.
CPC ......... *H02M 5/4585* (2013.01); *H02M 3/158* (2013.01); *H02P 27/06* (2013.01)

(58) Field of Classification Search
CPC .. H02M 3/1582; H02M 3/1584; H02M 3/285; H02M 3/33561; H02M 7/49;
(Continued)

(56) References Cited

U.S. PATENT DOCUMENTS

| 8,792,261 B2* | 7/2014 | Inoue ............... H02M 7/4835 363/129 |
| 2011/0127837 A1* | 6/2011 | Sato ..................... H02J 9/062 307/66 |

(Continued)

FOREIGN PATENT DOCUMENTS

| CN | 106233596 | * 12/2016 |
| CN | 106452099 A | 2/2017 |

(Continued)

OTHER PUBLICATIONS

International Search Report dated Aug. 20, 2019 in PCT/JP2019/022176 filed on Jun. 4, 2019, 2 pages.

*Primary Examiner* — Thienvu V Tran
*Assistant Examiner* — Nusrat Quddus
(74) *Attorney, Agent, or Firm* — Oblon, McClelland, Maier & Neustadt, L.L.P.

(57) ABSTRACT

A power conversion device in an embodiment includes a first power converter; a plurality of direct current-direct current (DCDC) converter devices; and a second power converter. The first power converter includes a plurality of first positive-side arms; a plurality of first negative-side arms; a first positive-side star connection line configured to connect the plurality of first positive-side arms in a star shape; a first negative-side star connection line configured to connect the plurality of first negative-side arms in a star shape; and a first terminal configured to connect the first positive-side star connection line and the first negative-side star connection line to each phase of a power supply side alternating current (AC) system and the plurality of first positive-side arms and the plurality of first negative-side arms mutually convert a first AC power and a first DC power of the power supply side AC system. A plurality of DCDC converter devices mutually convert the first DC power and the second DC power. The second power converter includes (Continued)

a plurality of second positive-side arms; a plurality of second negative-side arms; a second positive-side star connection line configured to connect the plurality of second positive-side arms in a star shape; a second negative-side star connection line configured to connect the plurality of second negative-side arms in a star shape; and a second terminal configured to connect the second positive-side star connection line and the second negative-side star connection line to each phase of a load-side AC system, and the plurality of second positive-side arms and the plurality of second negative-side arms mutually convert the second DC power and the second AC power.

18 Claims, 10 Drawing Sheets

(58) Field of Classification Search
CPC ........ H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 5/40; H02M 5/42; H02M 5/453; H02M 7/7575; H02M 7/261; H02M 5/458; H02M 5/45; H02M 5/4585; H02M 5/4505; H02M 5/451; H02M 5/452; H02M 5/447; H02M 5/456; H02M 1/12; H02M 1/4266; H02M 2001/123; H02M 7/073; H02M 3/10; H02M 3/135; H02M 3/137; H02M 3/28; H02M 3/315; H02M 3/3155; H02M 3/325; H02M 3/335; H02M 7/515; H02M 7/521; H02M 7/53; H02M 7/537; H02M 7/5383; H02M 7/53862; H02M 7/757; H02M 7/79; H02M 3/337; H02M 3/338; H02M 3/3382; H02M 3/3384; H02M 7/538; H02M 7/53832; H02M 7/53835; H02M 7/487; H02M 7/539; H02M 7/23; H02M 7/21; H02M 7/12; H02M 7/04; H02M 7/00; H02J 3/46; H02J 3/38; H02J 3/36; H02J 3/01; H02H 7/268; H02H 7/122; H02H 7/1222; H02H 7/1225; H02H 7/1227; H02H 7/125; H02H 7/1252; H02H 7/1255; H02H 7/1257

See application file for complete search history.

(56) References Cited

U.S. PATENT DOCUMENTS

| | | | | |
|---|---|---|---|---|
| 2011/0134672 | A1* | 6/2011 | Sato | H02M 1/10 363/126 |
| 2011/0170322 | A1* | 7/2011 | Sato | H02M 7/487 363/40 |
| 2011/0211381 | A1* | 9/2011 | Iwata | H02M 7/4835 363/132 |
| 2014/0103887 | A1* | 4/2014 | Akagi | H02J 3/1857 323/207 |
| 2020/0091831 | A1* | 3/2020 | Kadota | H02M 7/219 |
| 2020/0185960 | A1* | 6/2020 | Toyoda | H02M 7/487 |
| 2021/0036632 | A1* | 2/2021 | Hayashi | H02M 3/157 |
| 2023/0051706 | A1* | 2/2023 | Toi | H02M 7/4835 |

FOREIGN PATENT DOCUMENTS

| | | |
|---|---|---|
| JP | 2008-301640 A | 12/2008 |
| WO | WO 2015/128455 A2 | 9/2015 |
| WO | WO 2015/128455 A3 | 9/2015 |
| WO | WO 2018/225410 A1 | 12/2018 |

* cited by examiner

POWER CONVERSION DEVICE AND POWER CONVERSION CONTROL DEVICE

TECHNICAL FIELD

An embodiment of the present invention relates to a power conversion device and a power conversion control device.

BACKGROUND ART

There are power conversion devices (indirect alternating current (AC) converters) which convert first multi-phase AC power supplied from power supply side AC systems into second multi-phase AC power using indirect conversion methods. Power conversion devices which convert relatively large amounts of power form multilevel converters when connecting single-phase converter cells in series.

Also, the active power supplied to each phase of the second multi-phase AC power may become imbalanced due to events or the like which occur on load sides of power conversion devices and has an influence on the power supply side AC systems which supply the first multi-phase AC power in some cases.

CITATION LIST

Patent Literature

[Patent Literature 1]
Japanese Unexamined Patent Application, First Publication No. 2008-301640

SUMMARY OF INVENTION

Technical Problem

An object to be achieved by the present invention is to provide a power conversion device and a power conversion control device capable of reducing an influence of an imbalance between phases of active power supplied to a load side of a power conversion device in a power supply side AC system.

Solution to Problem

A power conversion device in an embodiment includes a first power converter; a plurality of direct current-direct current (DCDC) converter devices; and a second power converter. The first power converter includes a plurality of first positive-side arms; a plurality of first negative-side arms; a first positive-side star connection line configured to connect the plurality of first positive-side arms in a star shape; a first negative-side star connection line configured to connect the plurality of first negative-side arms in a star shape; and a first terminal configured to connect the first positive-side star connection line and the first negative-side star connection line to each phase of a power supply side alternating current (AC) system and the plurality of first positive-side arms and the plurality of first negative-side arms mutually convert a first AC power and a first DC power of the power supply side AC system. A plurality of DCDC converter devices mutually convert the first DC power and the second DC power. The second power converter includes a plurality of second positive-side arms; a plurality of second negative-side arms; a second positive-side star connection line configured to connect the plurality of second positive-side arms in a star shape; a second negative-side star connection line configured to connect the plurality of second negative-side arms in a star shape; and a second terminal configured to connect the second positive-side star connection line and the second negative-side star connection line to each phase of a load-side AC system, and the plurality of second positive-side arms and the plurality of second negative-side arms mutually convert the second DC power and the second AC power.

DESCRIPTION OF EMBODIMENTS

A power conversion device and a power conversion control device according to an embodiment will be described below with reference to the drawings. The power conversion device described below supplies desired alternating current (AC) power to an AC motor (a motor) which is an example of a load. The power conversion device in the embodiment includes an indirect AC converter. The description of connection in the embodiment includes electrically connecting.

Figure 1:
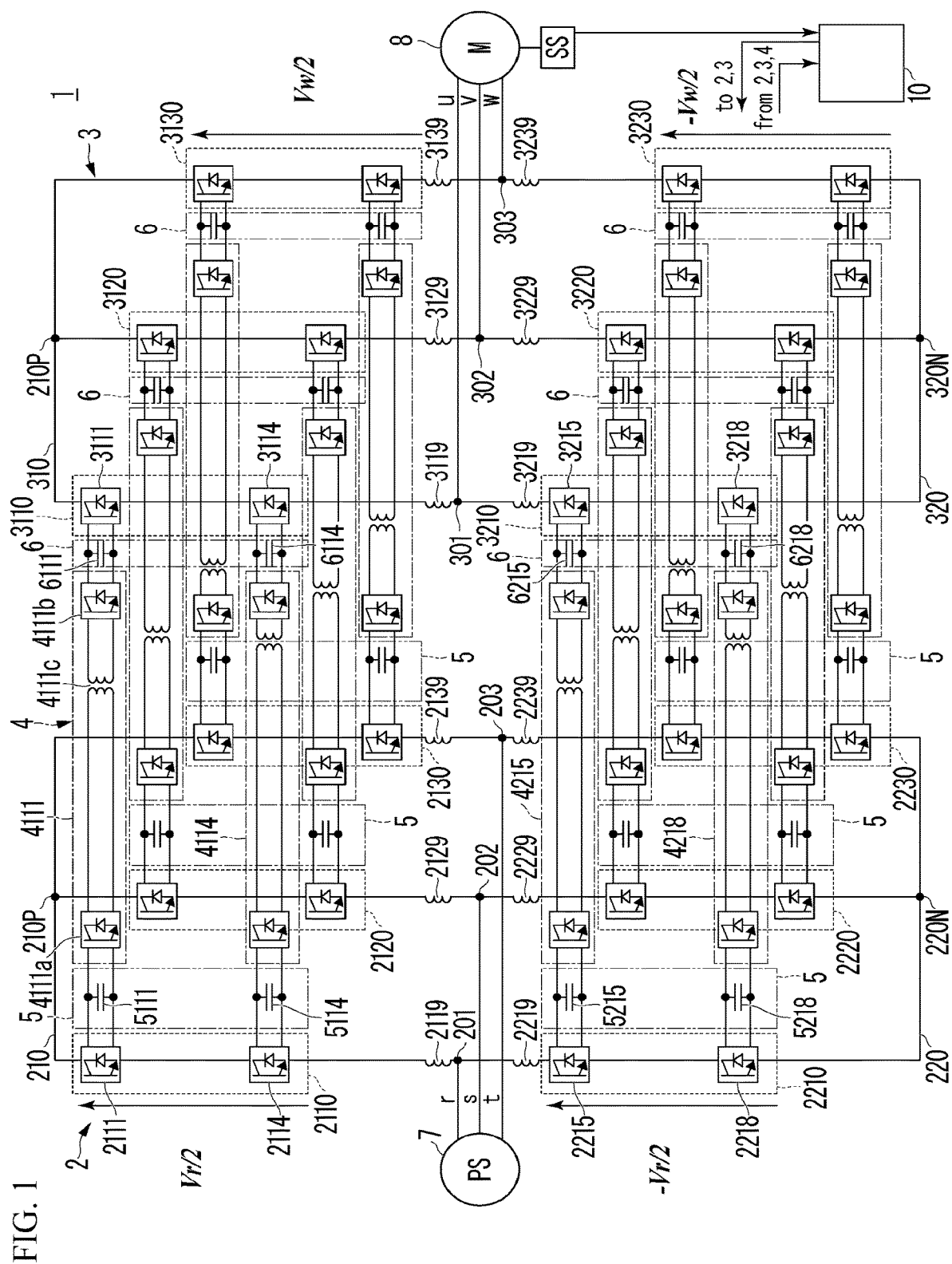
FIG. 1 is a constitution diagram of a power conversion device according to an embodiment.

FIG. 1 illustrates a constitution example of the power conversion device. FIG. 1 is a constitution diagram of the power conversion device according to the embodiment.

A power conversion device 1 illustrated in FIG. 1 includes, for example, a converter 2, an inverter 3, a direct current-direct current (DCDC) converter group 4, a converter-side capacitor group 5, an inverter-side capacitor group 6, and a control unit 10. The converter 2, the inverter 3, the DCDC converter group 4, the converter-side capacitor group 5, and the inverter-side capacitor group 6 form a main circuit of the power conversion device 1. A power supply side AC system 7 supplies, for example, multi-phase AC power (first AC power) to the power conversion device 1. For example, the power supply side AC system 7 supplies three-phase AC power, i.e., an r phase, an s phase, and a t phase. A load-side AC system 8 supplies, for example, multi-phase AC power (second AC power) from the power conversion device 1 to a load device. For example, the load-side AC system 8 supplies three-phase AC power, i.e., a u phase, a v phase, and a w phase.

First, the converter 2 will be described.

The converter 2 (a first power converter) mutually converts first AC power of the power supply side AC system 7 and first DC power. In other words, the converter 2 converts the first AC power into the first DC power during power running and converts the first DC power into the first AC power during regeneration. For example, the converter 2 includes first AC connection terminals 201, 202, and 203 connected to an r phase, an s phase, and a t phase of the power supply side AC system 7. The converter 2 exchanges the first AC power with the power supply side AC system 7 via the first AC connection terminals 201, 202, and 203.

The converter 2 includes a first positive-side star connection line 210 centering on a neutral point 210P and a first negative-side star connection line 220 centering on a neutral point 220N. r phases, s phases, and t phases of the first positive-side star connection line 210 and the first negative-side star connection line 220 are connected to the first AC connection terminals 201, 202, and 203 in a star shape. When the first positive-side star connection line 210 and the first negative-side star connection line 220 are not distinguished, they are collectively simply referred to as a "converter star connection line." The star connection line may be a Y-type connection line.

The converter 2 includes an r-phase first arm 2110, an s-phase first arm 2120, a t-phase first arm 2130, an r-phase second arm 2210, an s-phase second arm 2220, a t-phase second arm 2230, and reactors 2119, 2129, 2139, 2219, 2229, and 2239.

The r-phase first arm 2110 is provided for an r phase of the first positive-side star connection line 210, the s-phase first arm 2120 is provided for an s phase thereof, and the t-phase first arm 2130 is provided for a t phase thereof. The r-phase first arm 2110, the s-phase first arm 2120, and the t-phase first arm 2130 are collectively simply referred to as a "converter first arm" (a plurality of first positive-side arms).

The r-phase second arm 2210 is provided for an r phase of the first negative-side star connection line 220, the s-phase second arm 2220 is provided for an s phase thereof, and the t-phase second arm 2230 is provided for a t phase. The r-phase second arm 2210, the s-phase second arm 2220, and the t-phase second arm 2230 are collectively simply referred to as a "converter second arm" (a plurality of first negative-side arms).

In other words, the converter first arm and the converter second arm are provided for each phase of the converter star connection line. The converter first arm and the converter second arm include at least one single-phase converter cell (for example, refer to FIG. 2) and mutually convert the first AC power of the power supply side AC system 7 and the first DC power. Each of the converter first arm and the converter second arm in the examples illustrated in the following description includes four single-phase converter cells. This number is an example and may be 3 or less or 5 or more.

For example, single-phase converter cells 2111 to 2114 are provided in the r-phase first arm 2110. Single-phase converter cells 2215 to 2218 are provided in the r-phase second arm 2210. The description of the single-phase converter cells 2112, 2113, 2216, and 2217 in FIG. 1 is omitted. The same applies to the s phase and the t phase and the description of reference numerals of the single-phase converter cells is omitted.

Each of the single-phase converter cells mutually converts a part of the first AC power of the power supply side AC system 7 and a part of the first DC power.

As described above, in the converter first arm and the converter second arm of the converter 2, a series circuit in which single-phase converter cells are connected in series for each arm is connected through a star connection line. A series circuit including a single-phase converter cell is provided for each phase of the converter first arm and the converter second arm.

If the converter first arm and the converter second arm are directly connected, a short-circuit current flows in the converter 2. In order to prevent this, for example, the converter first arm and the converter second arm may be connected via a reactor. In the case of the r phase, the r-phase first arm 2110 and the r-phase second arm 2210 are connected via the reactor 2119 and the reactor 2219. The same applies to the s phase and the t phase. Each of the reactors may be a single-phase reactor provided for each of the converter first arm and the converter second arm or may be a combination reactor.

The single-phase converter cell of the converter 2 is associated with one DCDC converter device which will be described later in the DCDC converter group 4 and one first capacitor which will be described later in the converter-side capacitor group 5. A DC side of the single-phase converter cell is connected in parallel to a first DC terminal of one DCDC converter device in the DCDC converter group 4 and one first capacitor in the converter-side capacitor group 5.

For example, a capacitor 5111 is connected to the single-phase converter cells 2111. The capacitor 5114 is connected to the single-phase converter cell 2114. Although not shown in the drawings, the same applies to the capacitors 5112 and 5113. That is to say, the capacitors 5111 to 5114 are connected to the single-phase converter cells 2111 to 2114. Similarly, the capacitors 5215 to 5218 are connected to the single-phase converter cells 2215 to 2218. The same applies to the s phase and the t phase. The details thereof are provided with reference to FIG. 3. The capacitors 5111 to 5114, the capacitors 5215 to 5218, and the like are examples of the first capacitor.

The inverter 3 will be described below.

The inverter 3 (a second power converter) mutually converts second DC power and second AC power. The inverter 3 converts the second DC power into the second AC power during power running and converts the second AC power into the second DC power during regeneration. For example, the inverter 3 includes the second AC connection terminals 301, 302, and 303 connected to a u phase, a v phase, and a w phase of the load-side AC system 8. The inverter 3 exchanges second AC power with a load device M connected to the load-side AC system 8 via the second AC connection terminals 301, 302, and 303.

The inverter 3 includes a second positive-side star connection line 310 centering on the neutral point 310P and a second negative-side star connection line 320 centering on the neutral point 320N. U phases, v phases, and w phases of the second positive-side star connection line 310 and the second negative-side star connection line 320 are connected to the second AC connection terminals 301, 302, and 303 in a star shape. When the second positive-side star connection line 310 and the second negative-side star connection line 320 are not distinguished, they are collectively simply referred to as an "inverter star connection line."

The inverter 3 includes a u-phase first arm 3110, a v-phase first arm 3120, a w-phase first arm 3130, a u-phase second arm 3210, a v-phase second arm 3220, a w-phase second arm 3230, and reactors 3119, 3129, 3139, 3219, 3229, and 3239.

The u-phase first arm 3110 is provided for a u phase of the second positive-side star connection line 310, the v-phase first arm 3120 is provided for a v phase thereof, and the w-phase first arm 3130 is provided for a w phase thereof. The u-phase first arm 3110, the v-phase first arm 3120, and the w-phase first arm 3130 are collectively simply referred to as an "inverter first arm" (a plurality of second positive-side arms).

The u-phase second arm 3210 is provided for a u phase of the second negative-side star connection line 320, the v-phase second arm 3220 is provided for a v phase thereof, and the w-phase second arm 3230 is provided for a w phase thereof. The u-phase second arm 3210, the v-phase second arm 3220, and the w-phase second arm 3230 are collectively simply referred to as an "inverter second arm" (a plurality of second negative-side arms).

In other words, the inverter first arm and the inverter second arm are provided for each phase of the inverter star connection line. The inverter first arm and the inverter second arm include at least one single-phase inverter cell and mutually convert the second AC power of the load-side AC system 8 and the second DC power. The inverter first arm and the inverter second arm in examples in the following description include four single-phase inverter cells. This number is an example and may be 3 or less or 5 or more as long as it is equal to the number of single-phase converter cells in the converter 2.

For example, single-phase inverter cells 3111 to 3114 connected in a cascade manner are provided in the u-phase first arm 3110. Single-phase inverter cells 3215 to 3218 connected in a cascade manner are provided in the u-phase second arm 3210. The description of the single-phase inverter cells 3112, 3113, 3216, and 3217 is omitted. The same applies to the v phase and the w phase and the description of reference numerals is omitted.

Each of the single-phase inverter cells mutually converts a part of the second AC power of the load-side AC system 8 and a part of the second DC power.

As described above, in the inverter first arm and the inverter second arm of the inverter 3, a series circuit in which single-phase inverter cells are connected in series for each arm is connected through a star connection line. A series circuit including a single-phase inverter cell is provided for each phase of the inverter first arm and the inverter second arm.

If the inverter first arm and the inverter second arm are directly connected, a short-circuit current flows in the inverter 3. In order to prevent this, for example, the inverter first arm and the inverter second arm may be connected via a reactor. In the case of the u phase, the u-phase first arm 3110 and the u-phase second arm 3210 are connected via the reactor 3119 and the reactor 3219. The same applies to the v phase and the w phase. Each of the reactors has the same magnitude of inductive reactance. Each of the reactors may be a single-phase reactor provided in each of the inverter first arm and the inverter second arm or may be a combination reactor.

A single-phase inverter cell of the inverter 3 is associated with one DCDC converter device which will be described later in the DCDC converter group 4 and one second capacitor which will be described later in the inverter-side capacitor group 6. The DC side of the inverter 3 is connected to a second DC terminal which will be described later of each DCDC converter device in the DCDC converter group 4.

For example, also in the inverter 3, as in the converter 2 described above, capacitors 6111 to 6114 are connected to the single-phase inverter cells 3111 to 3114. Capacitors 6215 to 6218 are connected to the single-phase inverter cells 3215 to 3218. The description of the capacitors 6112, 6113, 6216, and 6217 is omitted. The same applies to the v phase and the w phase. The details thereof are provided with reference to FIG. 4. The capacitors 6111 to 6114, the capacitors 6215 to 6218, and the like are examples of the second capacitor.

The DCDC converter group 4 will be described below.

The DCDC converter group 4 includes a plurality of DCDC converter devices capable of bidirectionally transmitting power. For example, the DCDC converter devices 4111 to 4114 and 4215 to 4218 which connect the r phase and the u phase are examples of a plurality of DCDC converter devices. The description of the DCDC converter devices 4112, 4113, 4216, and 4217 is omitted in FIG. 1. The description of reference numerals of a plurality of DCDC converter devices which connect the s phase and the v phase and a plurality of DCDC converter devices which connect the t phase and the w phase is omitted. The same applies to a case in which an s phase and a v phase are connected, a case in which a t phase and a w phase are connected, and a case in which the r phase and the u phase are connected. A plurality of DCDC converter devices are collectively referred to as a "DCDC converter device 4000."

For example, the DCDC converter device 4000 includes a first DC terminal and a second DC terminal. The first DC terminal of the DCDC converter device 4000 is connected to a DC side of the single-phase converter cell of the converter 2 and the second DC terminal of the DCDC converter device 4000 is connected to a DC side of the single-phase converter cell of the inverter 3. The DCDC converter device 4000 electrically connects a DC side of the single-phase converter cell of the converter 2 to a DC side of the single-phase converter cell of the inverter 3. As described above, the DCDC converter device 4000 is an insulation type DC power converter connected to the converter 2 and the inverter 3 and bidirectionally converts power.

As an example of a first combination, a DCDC converter device 4111 electrically connects a DC side of the single-phase converter cell 2111 to a DC side of a single-phase inverter cell 3111. As an example of a second combination, a DCDC converter device 4114 electrically connects a DC side of a single-phase converter cell 2114 to a DC side of a single-phase inverter cell 3114.

The DCDC converter device 4111 is an example of the first DCDC converter device. The single-phase converter cell 2111 is an example of the first single-phase converter cell. The single-phase inverter cell 3111 is an example of the first single-phase inverter cell. Furthermore, the DCDC converter device 4114 is an example of the second DCDC converter device. The single-phase converter cell 2114 is an example of the second single-phase converter cell. The single-phase inverter cell 3114 is an example of the second single-phase inverter cell.

The DCDC converter device 4111 and the DCDC converter device 4114 are insulated from each other and controlled independently. For example, the DCDC converter device 4111 and the DCDC converter device 4114 are connected via at least the single-phase converter cell 2111. From another viewpoint, the DCDC converter device 4111 and the DCDC converter device 4114 are connected via at least the single-phase converter cell 2111 and the single-phase converter cell 2114. Furthermore, the DCDC converter device 4111 and the DCDC converter device 4114 are connected via at least the single-phase inverter cell 3111. From still another viewpoint, the DCDC converter device 4111 and the DCDC converter device 4114 are connected via at least the single-phase inverter cell 3111 and the single-phase inverter cell 3114.

For example, the DCDC converter device 4000 includes two single-phase full bridge circuits and a single-phase transformer.

The DCDC converter device 4000 adjusts an amount of power conversion so that a DC voltage of a single-phase converter cell connected to a first single-phase full bridge circuit matches a DC voltage of a single-phase inverter cell connected to a second single-phase full bridge circuit. Thus, the DCDC converter device 4000 mutually converts power between the converter 2 and the inverter 3 by mutually converting power (first DC power) of the first single-phase full bridge circuit on the DC side thereof and power (second DC power) of the second single-phase full bridge circuit on the DC side thereof.

The DCDC converter device 4000 is not limited to the above circuit system and may form an insulation type DCDC converter capable of mutually transmitting DC power using another circuit system. For example, a combination of two three-phase bridge circuits and a three-phase transformer is an example of a modified example of the DCDC converter device 4000.

Figure 2A:
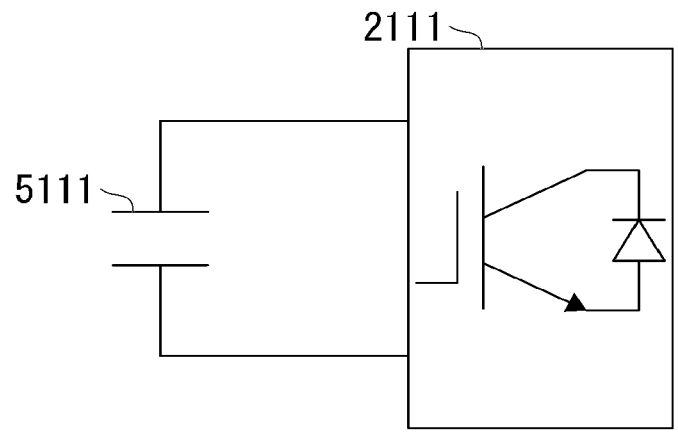
FIG. 2A is a constitution diagram of a single-phase converter cells according to the embodiment.
Figure 2B:
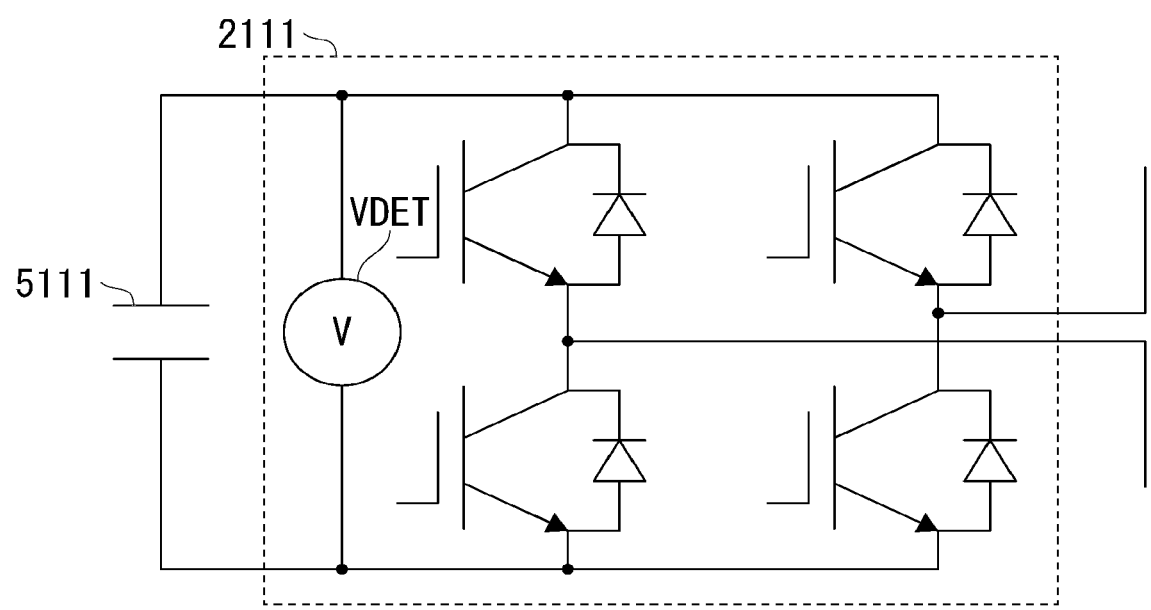
FIG. 2B is a constitution diagram of the single-phase converter cells according to the embodiment.

FIGS. 2A and 2B are constitution diagrams of a single-phase converter cell according to the embodiment.

FIGS. 2A and 2B illustrate the single-phase converter cell 2111. As illustrated in FIG. 2B, the single-phase converter cell 2111 is, for example, a single-phase full bridge type in which a plurality of semiconductor elements are combined. Each of the semiconductor elements illustrated in FIG. 2B is an insulated gate bipolar transistor (IGBT). The semiconductor element is not limited to an IGBT and may be another type such as an FET. The description of the single-phase converter cell 2111 illustrated in FIG. 2B is omitted in the description explained in association with FIG. 2A.

An AC side of the single-phase converter cell 2111 in the embodiment is connected to the other single-phase converter cells 2112, 2113, 2114 in a common arm (the r-phase first arm 2110) in a cascade manner.

The corresponding capacitor 5111 is provided on a DC side of the single-phase converter cell 2111 in the embodiment. Furthermore, a voltage detector VDET configured to detect a terminal voltage (a converter-side capacitor voltage) of the capacitor 5111 is provided in the single-phase converter cell 2111. A voltage detected through the voltage detector VDET is used for control in the control unit 10. Single-phase converter cells other than the single-phase converter cell 2111 are similarly configured.

A circuit constitution of the single-phase converter cell and a circuit constitution of the single-phase inverter cell may be the same or different. The single-phase converter cell and the single-phase inverter cell are not limited to the circuits illustrated in the drawings. In addition, the single-phase converter cell and the single-phase inverter cell are not limited to a single-phase full bridge and may have other constitutions without limited to the illustrated circuit as long as they have a constitution capable of converting a DC voltage to an AC voltage. The neutral point clamp type and the half bridge type are examples of other constitutions of the single-phase converter cell.

An outline of an operation associated with power conversion will be described below by exemplifying the r phase of the converter 2. In the converter 2, the r-phase first arm 2110 outputs a voltage of Vr/2 and the r-phase second arm 2210 outputs a voltage of −Vr/2. Thus, a voltage of Vr obtained by adding the above voltages is output to the r phase of a first alternating current. The same applies to the s phase and the t phase as in the r phase. The same applies to the inverter side.

A relationship between the capacitor 5111 and the capacitor 6111 is summarized using the DCDC converter device 4111 as a reference with reference to FIGS. 1, 2A, and 2B. As illustrated in FIG. 1, the DCDC converter device 4111 is connected to the capacitor 5111 (the first capacitor) provided in association with the single-phase converter cell 2111 and the capacitor 6111 (the second capacitor) provided in association with the single-phase inverter cell 3111. The DCDC converter device 4111 is an example of one DCDC converter device among a plurality of DCDC converter devices. The single-phase converter cell 2111 is an example of one single-phase converter cell among a plurality of single-phase converter cells. The single-phase inverter cell 3111 is an example of one single-phase inverter cell among a plurality of single-phase inverter cells. For example, the DCDC converter device 4111 controls conversion of DC power so that an instantaneous value of a voltage of the capacitor 6111 is constant. The same applies to the other DCDC converter devices 4000.

The definition of signal names according to the embodiment will be described below with reference to FIGS. 3 and 4.

Figure 3:
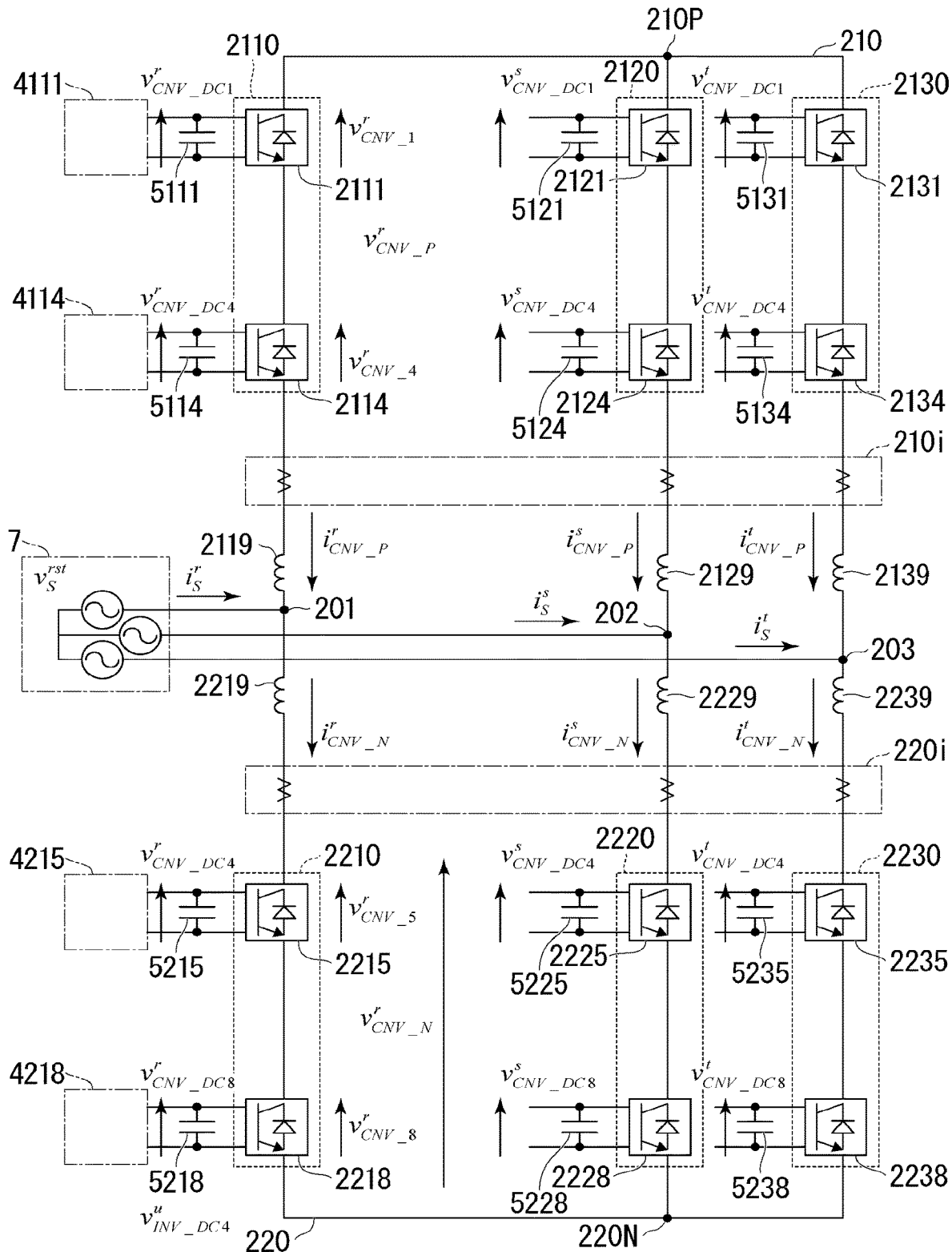
FIG. 3 is a diagram for explaining the definition of signal names of a converter according to the embodiment.

FIG. 3 is a diagram for explaining the definition of the signal names of a converter according to the embodiment.

Phase voltages (instantaneous values) of three phases of the power supply side AC system 7 are indicated by system voltage detection values $vS\hat{}r$, $vS\hat{}s$, and $vS\hat{}t$. In addition, they are collectively referred to as a "system voltage detection value $vS\hat{}rst$." In the description in the text, the above "^ (a hat)" indicates that the character following this hat is in superscript.

On the other hand, in an arithmetic expression which will be described later, for example, the system voltage detection value $vS\hat{}rst$ is expressed as shown in Expression (1). The left side of Expression (1) is represented by a vector and the right side thereof is represented by dividing into elements of a matrix. Each element of the matrix is identified by the superscript on a variable on the right side. The superscript "T" in the matrix indicates a transposition matrix.

$$v_S^{rst} = [v_S^r v_S^s v_S^t]^T \qquad (1)$$

Similarly, phase currents (instantaneous values) of three phases are indicated by system current detection values $iS\hat{}r$, $iS\hat{}s$, and $iS\hat{}t$. In addition, they are collectively a "system current detection value $iS\hat{}rst$ (not shown)." A direction in which a phase current of each phase is directed from the power supply side AC system 7 toward the converter 2 is positive. A basic frequency of AC power of the power supply side AC system 7 is shown by fS.

A detected value of a voltage of a capacitor of each arm of the converter 2 is defined as follows. For example, capacitor voltages vCNV_DC1^r and vCNV_DC4^r are voltages of the capacitors 5111 and 5114 associated with the r-phase first arm. The voltages of the capacitors 5111 to 5114 associated with the r-phase first arm are collectively referred to as a "capacitor voltage vCNV_DC1-4^r." The capacitor voltages vCNV_DC5^r and vCNV_DC8^r are voltages of the capacitors 5215 and 5218 associated with the r-phase second arm. The voltages of the capacitors 5215 to 5218 associated with the r-phase second arm are collectively referred to as a "capacitor voltage vCNV_DC5-8ˆr" Similarly, the capacitor voltage vCNV_DC1-4ˆs and the capacitor voltage vCNV_DC5-8ˆs are voltages of the capacitors 5121 to 5124 associated with the s-phase first arm and the capacitors 5125 to 5128 associated with the s-phase second arm. The capacitor voltage vCNV_DC1-4ˆt and the capacitor voltage vCNV_DC5-8ˆt are voltages of the capacitors 5131 to 5134 associated with the t-phase first arm and the capacitors 5135 to 5138 associated with the t-phase second arm. The voltage of the capacitor of each arm of the converter 2 is referred to as a "converter-side capacitor voltage."

A voltage of the r-phase first arm 2110 of the converter 2 is indicated by vCNV_Pˆr and a voltage of the r-phase second arm 2210 is indicated by vCNV_Nˆr. Although not shown in the drawings, a voltage of the s-phase first arm 2120 is indicated by vCNV_Pˆs, a voltage of the s-phase second arm 2220 is indicated by vCNV_Nˆs, a voltage of the t-phase first arm 2130 is indicated by vCNV_Pˆt, and a voltage of the t-phase second arm 2230 is indicated by vCNV_Nˆt.

A voltage generated by the single-phase converter cell in the r-phase first arm 2110 is defined as follows. A voltage generated by the single-phase converter cell 2111 is indicated by vCNV_1ˆr. A voltage generated by the single-phase converter cell 2114 in the r-phase second arm 2210 is indicated by vCNV_4ˆr, a voltage generated by the single-phase converter cell 2115 is indicated by vCNV_5ˆr, and a voltage generated by the single-phase converter cell 2118 is indicated by vCNV_8ˆr. The same applies to voltages generated by the other single-phase converter cells with an r phase. Although not described, the same applies to the s phase and the t phase.

A current flowing through the r-phase first arm 2110 is indicated by iCNV_Pˆr and a current flowing through the r-phase second arm 2210 is indicated by iCNV_Nˆr. A current flowing through the s-phase first arm 2120 is indicated by iCNV_Pˆs and a current flowing through the s-phase second arm 2220 is indicated by iCNV_Nˆs. A current flowing through the t-phase first arm 2130 is indicated by iCNV_Pˆt and a current flowing through the t-phase second arm 2230 is indicated by iCNV_Nˆt.

A current detector 210i is provided in the first positive-side star connection line 210, detects a current flowing through each arm of the first positive-side star connection line 210, and outputs a detected value (iCNV_Pˆrst). The current detector 220i detects a current flowing through each arm of the first negative-side star connection line 220 and outputs a detected value (iCNV_Nˆrst). Although the above description is an example in which a current of each phase is detected, for example, the current detector 210i and the current detector 220i may detect a current of the r phase and the s phase and calculate a current value of the remaining t phase from the detected current value using the following Expressions (2) and (3).

[Math. 2]

$$i_{CNV\_P}^{t} = -i_{CNV\_P}^{r} - i_{CNV\_P}^{s} \quad (2)$$

$$i_{CNV\_N}^{t} = -i_{CNV\_N}^{r} - i_{CNV\_N}^{s} \quad (3)$$

Figure 4:
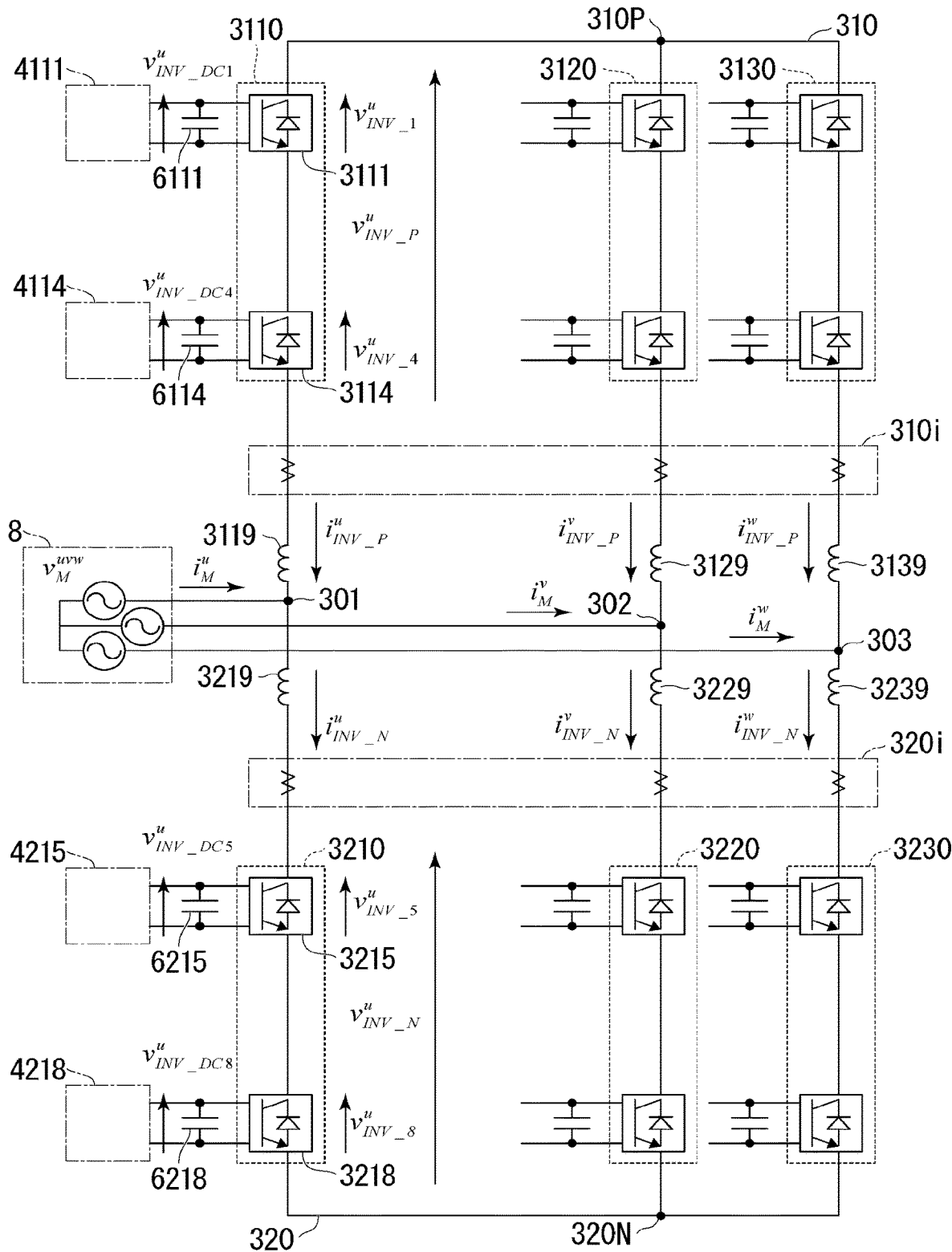
FIG. 4 is a diagram for explaining the definition of signal names of an inverter according to the embodiment.

FIG. 4 is a diagram for explaining the definition of signal names of an inverter according to the embodiment. The definition of the signal names of the inverter is defined as in the definition of the signal names of the converter described above. The rst phase is replaced with the uvw phase and the description of "CNV" is replaced with "INV." A part thereof will be described below.

A phase voltage (an instantaneous value) of the load-side AC system 8 is indicated by a load voltage detection value vMˆuvw and a phase current (an instantaneous value) thereof is indicated by a system current detection value iMˆuvw. In FIG. 4, this is illustrated separately for each phase. A direction in which a phase current of each phase is directed from the load-side AC system 8 toward the inverter 3 is positive. A basic frequency of AC power of the load-side AC system 8 is represented by fM.

A detected value of a voltage of a capacitor of each arm of the inverter 3 is defined as follows. The capacitor voltage vINV_DC1-4ˆu is a voltage of the capacitors 6111 to 6114 associated with the u-phase first arm. The capacitor voltage vINV_DC5-8ˆu is a voltage of the capacitors 6215 to 6218 associated with the u-phase second arm. The voltage of the capacitor of the arm of the inverter 3 described above is referred to as an "inverter-side capacitor voltage."

A voltage of the u-phase first arm 3110 of the inverter 3 is indicated by vINV_Pˆu and a voltage of the u-phase second arm 3210 is indicated by vINV_Nˆu.

A voltage generated by the single-phase converter cell in the u-phase first arm 3110 is defined as follows. A voltage generated by the single-phase inverter cell 3111 is indicated by vINV_1ˆu. The same applies to vINV_4ˆu, vINV_5ˆu, and vINV_8ˆu.

With regard to the above, the same applies to the v phase and the w phase as in the u phase.

The current detector 310i is provided in the second positive-side star connection line 310, detects a current flowing through each arm of the second positive-side star connection line 310, and outputs a detected value (iINV_Pˆuvw). The current detector 320i is provided in the second negative-side star connection line 320, detects a current flowing through each arm of the second negative-side star connection line 320, and outputs a detected value (iINV_Nˆuvw). Although the above description is an example when a current of each phase is detected, the current detector 310i and the current detector 320i may detect a current corresponding to any two phases and calculate a current value of the remaining phase from the detected current value.

The control in the power conversion device 1 according to the embodiment will be described below using a more specific example.

First, an outline of control in the power conversion device 1 will be described. The power conversion device 1 in the embodiment performs, for example, the following control.

Stabilization of Converter-Side Capacitor Voltage

For example, the converter 2 performs control so that amounts of direct currents of converter-side capacitor voltages are made uniform. At that time, each of the single-phase converter cells of the converter 2 performs control so that a converter-side capacitor voltage is stabilized to a predetermined voltage.

Stabilization of Inverter-Side Capacitor Voltage

The DCDC converter device 4000 performs control such that an instantaneous value becomes stable so that the inverter-side capacitor voltage becomes constant. For example, the DCDC converter device 4000 may apply known phase shift control to this control.

Control of Operation Status of Load Device M

The inverter 3 receives the control from a higher-level device and controls the load device M using a control method such as vector control. With the operation of the load device M, there may be a case in which the balance of phases of the load-side AC system 8 is lost or a low frequency pulsation occurs in the inverter-side capacitor voltage in some cases. The low frequency pulsation of the inverter-side capacitor voltage includes a 2fM component generated as a single-phase power pulsation when a basic frequency (fM) of AC power of the load-side AC system 8 is lower than a basic frequency fS (fM<fS). For example, if the basic frequency (fM) of AC power is 1 (Hz) and a basic frequency fS is 50 (Hz), 2 (Hz) power pulsation occurs. With a pulsation component in this frequency region, it is possible to reduce the low frequency pulsation by causing a reverse phase current of 50 (Hz: a basic frequency fS) to flow through the converter 2.

"Inverter-Side Low Frequency Pulsation Power Reduction Control"

When a low frequency pulsation occurs in an inverter-side capacitor voltage, the inverter 3 performs control to reduce the low frequency pulsation. For example, the inverter 3 may superimpose a high-frequency zero-phase voltage on an AC voltage and causes a circulation current with a frequency of the high frequency in the inverter 3. The "high-frequency zero-phase voltage" is obtained by superimposing a zero-phase voltage of a frequency component higher than a basic frequency (fM) of an alternating current of the load-side AC system 8 on an AC voltage. For example, a harmonic component (sine wave) of a basic frequency (fM) of AC power is an example of the "high frequency component." Thus, the inverter 3 reduces a low frequency pulsation of the inverter-side capacitor voltage. This is referred to as "inverter-side low frequency pulsation power reduction control."

"Converter-Side Low Frequency Pulsation Power Reduction Control"

A low-frequency pulsation component generated in the inverter-side capacitor voltage propagates toward the converter 2 side and a low-frequency pulsation component is generated in a converter-side capacitor voltage. The converter 2 causes a reverse phase circulation current of an AC fundamental wave (a basic frequency fS) to flow in the converter 2 in accordance with the calculation result (for example, a low-frequency pulsation power estimation value on the inverter side) of the inverter-side low frequency pulsation power reduction control and reduces a low-frequency pulsation component generated in the converter-side capacitor voltage. This is referred to as "converter-side low frequency pulsation power reduction control."

The power conversion device 1 combines the converter-side low frequency pulsation power reduction control with the inverter-side low frequency pulsation power reduction control and reduces a low-frequency pulsation component of a DC voltage such as an inverter-side capacitor voltage. For example, the distribution of the converter-side low frequency pulsation power reduction control and the inverter-side low frequency pulsation power reduction control may be determined in advance.

Figure 5:
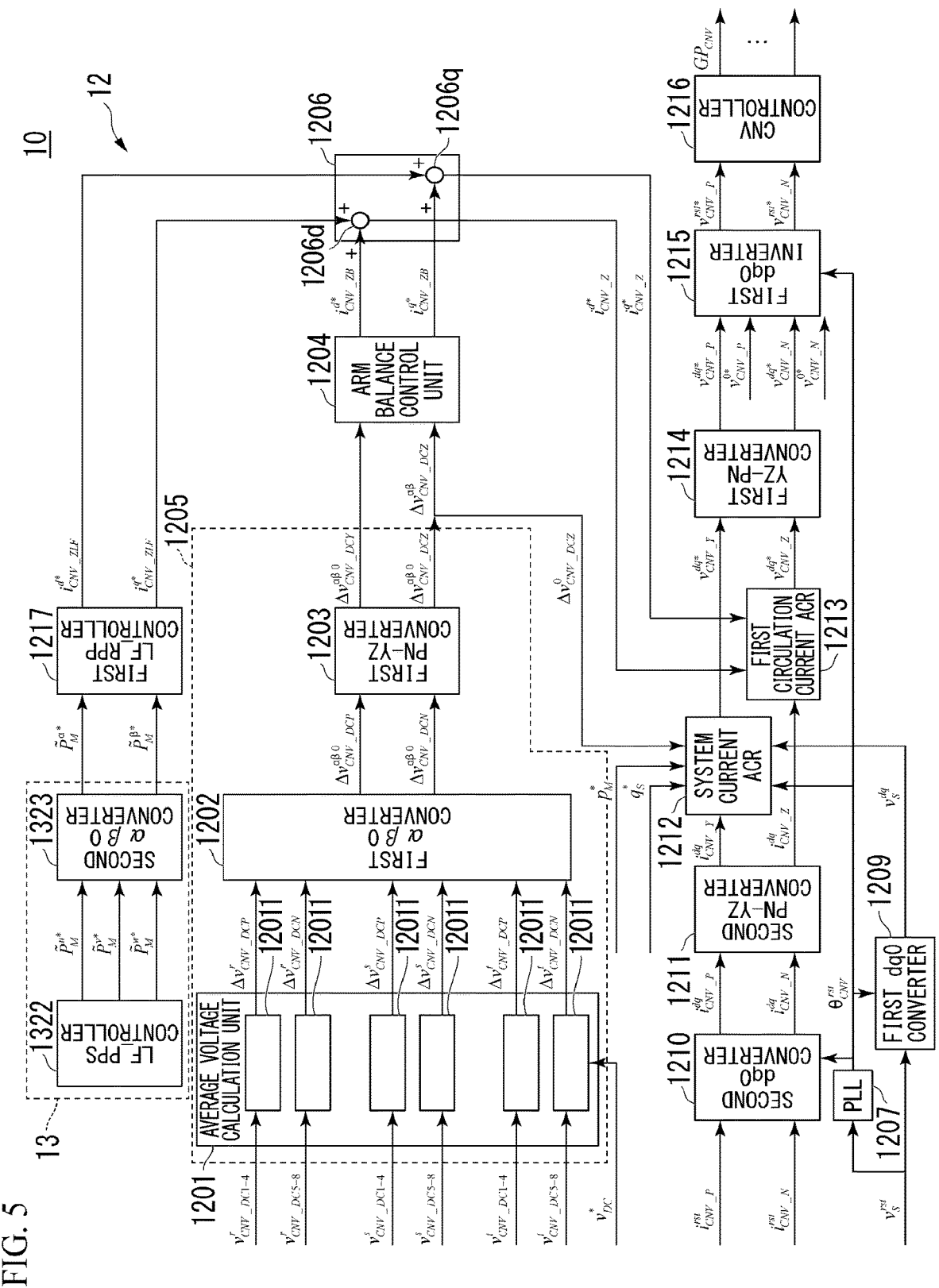
FIG. 5 is a constitution diagram of a control unit according to the embodiment.

A constitution example of the control unit 10 according to the embodiment will be described below with reference to FIG. 5. FIG. 5 is a constitution diagram of the control unit 10 according to the embodiment.

The control unit 10 includes a converter control unit 12 (a first control unit) and an inverter control unit 13 (a second control unit).

First, the converter control unit 12 will be described.

The converter control unit 12 includes an average voltage calculation unit 1201, a first αβ0 converter 1202, a first PN-YZ converter 1203, an arm balance control unit 1204, an adder 1206, a PLL circuit 1207 (described as a "phase-locked loop (PLL)" in the drawing), a first dq0 converter 1209, a second dq0 converter 1210, a second PN-YZ converter 1211, a system current automatic current regulator (ACR) 1212, a first circulation current control unit 1213, a first YZ-PN converter 1214, a first dq0 inverter 1215, a CNV controller 1216, and a first low-frequency pulsation power reduction control unit 1217 (described as a "first LF_RPP control unit" in the drawing). The average voltage calculation unit 1201, the first αβ0 converter 1202, and the first PN-YZ converter 1203 form a converter charge state detection unit 1205.

For example, the converter charge state detection unit 1205 detects the balance of the converter-side capacitor voltage on the basis of a command value of a DC voltage (a capacitor voltage command value vDC^*) applied to each capacitor and a detected value of the converter-side capacitor voltage, which is common to the capacitors of the arms of the converter 2. An example of the converter charge state detection unit 1205 will be described below.

The average voltage calculation unit 1201 includes six deviation amount calculation units 12011. Each of the deviation amount calculation units 12011 calculates an amount of deviation of a voltage of a capacitor in each arm on the basis of a capacitor voltage command value vDC^* of each arm of the converter 2 and a detected value of a voltage of a capacitor of each arm of the converter 2.

Figure 6:
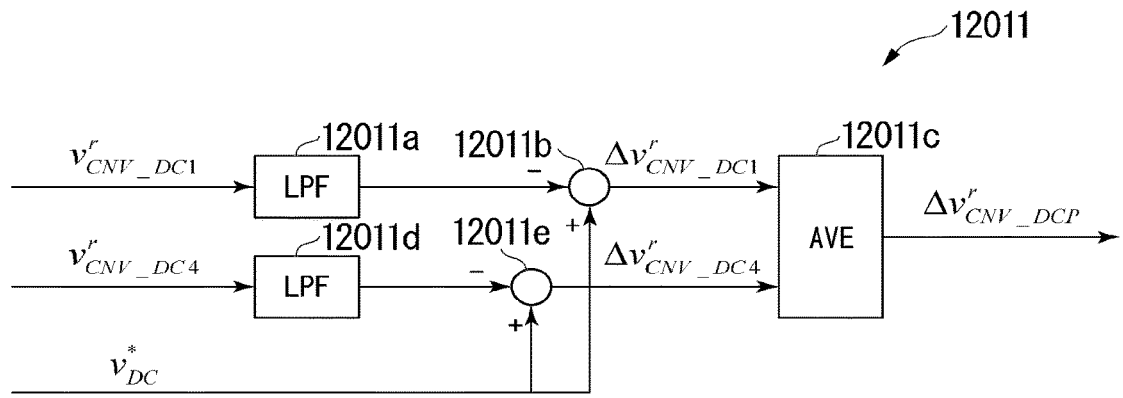
FIG. 6 is a constitution diagram of a deviation amount calculation unit 12011 according to the embodiment.

The calculation of the amount of deviation of the voltage of the capacitor in each arm will be described with reference to FIG. 6. FIG. 6 is a constitution diagram of each of the deviation amount calculation units 12011 according to the embodiment. The deviation amount calculation unit 12011 includes LPF calculation units 12011a and 12011b, subtractors 12011c and 12011d, and an average calculation unit 12011e.

A description will be provided by exemplifying a capacitor voltage vCNV_DC1-4^r as a converter-side capacitor voltage to be detected. The same applies to other cases.

For example, the LPF calculation unit 12011a is a low frequency pass filter (referred to as an "LPF") and extracts a low frequency component of a capacitor voltage vCNV_DC1^r. The LPF calculation unit 12011b is an LPF and similarly extracts a low frequency component of a capacitor voltage vCNV_DC4^r. For example, as for the LPF characteristics of the LPF calculation unit 12011a and the LPF calculation unit 12011b, a cutoff frequency of the LPF is determined so that an AC fundamental wave component (fS) is cut off. A low frequency component of a capacitor voltage vCNV_DC2-3^r is similarly extracted using an LPF calculation unit (not shown).

The subtractor 12011c subtracts the capacitor voltage command value vDC^* from the low frequency component of the capacitor voltage vCNV_DC1^r and outputs the resulting voltage deviation ΔvCNV_DC1^r. The subtractor 12011d subtracts the capacitor voltage command value vDC^* from the low frequency component of the capacitor voltage vCNV_DC4^r and outputs the resulting voltage deviation ΔvCNV_DC4^r. A voltage deviation ΔvCNV_DC2-3^r is similarly calculated using a subtractor (not shown).

The average calculation unit 12011e (described as an "AVE" in the drawing) calculates an average value of the voltage deviation ΔvCNV_DC1-4^r (a capacitor voltage deviation amount ΔvCNV_DCP^r).

Referring to FIG. 5 again, the amount of deviation of the voltage of the capacitor in each arm of the converter 2 is summarized.

The capacitor voltage deviation amount ΔvCNV_DCP^r is an average value of deviation amounts of the capacitor voltage vCNV_DC1-4^r of the capacitors 5111 to 5114 of the r-phase first arm with respect to the capacitor voltage command value vDC^*. A capacitor voltage deviation amount ΔvCNV_DCN^r is an average value of deviation amounts of the capacitor voltage vCNV_DC5-8^r of the capacitors 5115 to 5118 of the r-phase second arm with respect to the capacitor voltage command value vDC^*. A capacitor voltage deviation amount ΔvCNV_DCP^s is an average value of deviation amounts of the voltage of the capacitors 5121 to 5124 of the s-phase first arm with respect to the capacitor voltage command value vDC^*. A capacitor voltage deviation amount ΔvCNV_DCN^s is an average value of deviation amounts of the voltage of the capacitors 5125 to 5128 of the s-phase second arm with respect to the capacitor voltage command value vDC^*. A capacitor voltage deviation amount ΔvCNV_DCP^t is an average value of deviation amounts of the voltage of the capacitors 5131 to 5134 of the t-phase first arm with respect to the capacitor voltage command value vDC^*. A capacitor voltage deviation amount ΔvCNV_DCN^t is an average value of deviation amounts of the voltage of the capacitors 5135 to 5138 of the t-phase second arm with respect to the capacitor voltage command value vDC^*. As described above, although a value output by the average voltage calculation unit 1201 is an average of each deviation amount, in the following description, the values to be output are simply referred to as a "capacitor voltage deviation amount."

As described above, the average voltage calculation unit 1201 outputs the capacitor voltage deviation amount of each phase as three-phase signals (ΔvCNV_DCP^rst and ΔvCNV_DCN^rst) in a fixed coordination system.

The first αβ0 converter 1202 converts a three-phase signal in the fixed coordination system into a two-phase signal in the fixed coordination system. This is referred to as "αβ0 conversion." The first αβ0 converter 1202 separately performs "αβ0 conversion" on the first arm and the second arm of the converter 2. For example, the first αβ0 converter 1202 calculates a capacitor voltage deviation amount ΔvCNV_DCP^αβ0 of the first arm of the converter 2 on the basis of the capacitor voltage deviation amount ΔvCNV_DCP^rst using Expression (4). The first αβ0 converter 1202 calculates a capacitor voltage deviation amount ΔvCNV_DCN^αβ0 of the second arm of the converter 2 on the basis of the capacitor voltage deviation amount ΔvCNV_DCN^rst using Expression (5). A determinant [C^αβ0] used for the "αβ0 conversion" in the above expressions is shown in Expression (6).

[Math. 3]

$$[\Delta v_{CNV\_DCP}^{\alpha\beta0}] = [C^{\alpha\beta0}][\Delta v_{CNV\_DCP}^{rst}] \tag{4}$$

$$[\Delta v_{CNV\_DCN}^{\alpha\beta0}] = [C^{\alpha\beta0}][\Delta v_{CNV\_DCN}^{rst}] \tag{5}$$

$$[C^{\alpha\beta0}] = \sqrt{\frac{2}{3}} \begin{bmatrix} 1 & -1/2 & -1/2 \\ 0 & \sqrt{3}/2 & -\sqrt{3}/2 \\ 1/\sqrt{2} & 1/\sqrt{2} & 1/\sqrt{2} \end{bmatrix} \tag{6}$$

The first PN-YZ converter 1203 converts a variable on the basis of the two-phase signal in the fixed coordination system which has been coordinate-converted through the first αβ0 converter 1202. This conversion process is referred to as "PN-YZ conversion." For example, the first PN-YZ converter 1203 converts the variable on the basis of the capacitor voltage deviation amount ΔvCNV_DCP^αβ0 and the capacitor voltage deviation amount ΔvCNV_DCN^αβ0 using the following Expression (7), calculates the capacitor voltage deviation amount ΔvCNV_DCY^αβ0 and the capacitor voltage deviation amount ΔvCNV_DCZ^αβ0, and separates a DC voltage imbalance amount between the arms.

[Math. 4]

$$\begin{bmatrix} \Delta v_{CNV\_DCY}^{\alpha\beta0} \\ \Delta v_{CNV\_DCZ}^{\alpha\beta0} \end{bmatrix} = \begin{bmatrix} -1 & 1 \\ 1 & 1 \end{bmatrix} \begin{bmatrix} \Delta v_{CNV\_DCP}^{dq0} \\ \Delta v_{CNV\_DCN}^{dq0} \end{bmatrix} \tag{7}$$

The arm balance control unit 1204 will be described below.

The arm balance control unit 1204 generates a current command value so that the voltages of the arms are equal to each other on the basis of the calculation result using the first PN-YZ converter 1203.

For example, the arm balance control unit 1204 generates a current command value iCNV_ZB^d* and a current command value iCNV_ZB^q* for adjusting a circulation current on the basis of the capacitor voltage deviation amount ΔvCNV_DCY^αβ0 and the capacitor voltage deviation amount ΔvCNV_DCZ^αβ. The arm balance control unit 1204 supplies the generated current command value iCNV_ZB^d* to a d-axis adder 1206d which will be described later and supplies a current command value iCNV_ZB^q* to a q-axis adder 1206q which will be described later. The details of the arm balance control unit 1204 will be described later.

The first low-frequency pulsation power reduction control unit 1217 will be described below.

The first low-frequency pulsation power reduction control unit 1217 calculates a current command value iCNV_ZLF^d* and a current command value iCNV_ZLF^q* on the basis of low-frequency pulsation components ~pM^α* and ~pM^β* of an αβ0 coordinate system supplied from the inverter control unit 13. The inverter control unit 13 includes at least the LF_PPS controller 1322 and the second αβ0 converter 1323. The details of the first low-frequency pulsation power reduction control unit 1217 and the inverter control unit 13 will be described later.

The adder 1206 adds the calculation result of the arm balance control unit 1204 to the calculation result which will be described later of the first low-frequency pulsation power reduction control unit 1217. For example, the adder 1206 includes the d-axis adder 1206d and the q-axis adder 1206q. The d-axis adder 1206d adds a current command value iCNV_ZB^d* of a first input signal to a current command value iCNV_ZLF^d* of a second input signal which will be described and outputs a current command value iCNV_Z^d*. The q-axis adder 1206q adds a current command value iCNV_ZB^q* of the first input signal to a current command value iCNV_ZLF^q* of the second input signal which will be described and outputs a current command value iCNV_Z^q*.

The PLL circuit 1207 will be described below.

The PLL circuit 1207 includes, for example, an r-phase PLL circuit (not shown), an s-phase PLL circuit, and a t-phase PLL circuit. The r-phase PLL circuit of the PLL circuit 1207 extracts, for example, a fundamental wave component or the like of a voltage of the power supply side AC system 7 on the basis of an A-B line voltage and generates a phase θCNV^r. The phase θCNV^r is synchronized with a phase of a fundamental wave of a voltage of an r phase of the power supply side AC system 7. Similarly, the s-phase PLL circuit of the PLL circuit 1207 generates a phase θCNV^s on the basis of a B-C line voltage. The s-phase PLL circuit of the PLL circuit 1207 generates a phase θCNV^t on the basis of a C-A line voltage. The phase θCNV^r, the phase θCNV^s, and the phase θCNV^t have phase differences of (2π/3) radians with respect to each other. The phase θCNV^rst is equivalent to an integrated value of a power source angular frequency (an electrical angular velocity) ω and may be indicated by the product of power source angular frequency ω and time information (t) in the description in some cases.

The PLL circuit 1207 may be a three-phase PLL. In this case, the PLL circuit 1207 extracts a fundamental wave component of a system voltage on the basis of a system voltage detection value vs^rst of the power supply side AC system 7 and generates a phase θCNV^rst synchronized with the fundamental wave component.

The PLL circuit 1207 supplies a representative value of the phase θCNV^rst to the first dq0 converter 1209, the second dq0 converter 1210, the system current ACR 1212, and the first dq0 inverter 1215 which will be described.

The first dq0 converter 1209 performs the αβ0 conversion on the three-phase signal in the fixed coordination system and further performs "αβ0-dq0 conversion" using the determinant shown in Expression (9) to convert the two-phase signal of the fixed coordination system into a two-phase signal of a rotation coordinate system with a dq0 axis as a reference. The two-step conversion using a reference angle signal θCNV^rst is collectively referred to as "three-phase-dq0 conversion." A system voltage detection value vS^rst of the power supply side AC system 7 detected by the voltage detector (not shown) is an example of a three-phase signal in the fixed coordination system. A system voltage detection value vS^dq is an example of a two-phase signal in the rotation coordinate system. The first dq0 converter 1209 performs the three-phase-dq0 conversion of the system voltage detection value vS^rst according to the following Expression (8) and calculates a system voltage detection value vS^dq0 as a result. Since a value of the system voltage detection value vS^0 is 0, the subsequent processes associated with the system voltage detection value vS^0 may be omitted.

[Math. 5]

$$[v_S^{dq0}] = [C^{dq0}][C^{\alpha\beta0}][v_S^{rst}] \quad (8)$$

$$[C^{dq0}] = \begin{bmatrix} \sin\omega t & -\cos\omega t & 0 \\ \cos\omega t & \sin\omega t & 0 \\ 0 & 0 & 1 \end{bmatrix} \quad (9)$$

Similarly, the second dq0 converter 1210 performs the three-phase-dq0 conversion on an rst phase current value iCNV_P^rst of a first arm and an rst phase current value iCNV_N^rst of a second arm of a detected value of each arm current of the converter 2 to convert the rst phase current value iCNV_P^rst and the rst phase current value iCNV_N^rst into an rst phase current value iCNV_P^dq0 of the first arm and an rst phase current value iCNV_N^dq0 of the second arm as shown in Expressions (10) and (11). Since components of the rst phase current value iCNV_P^0 of the first arm and the rst phase current value iCNV_N^0 of the second arm are not used in the subsequent processes, the calculation thereof may be omitted.

[Math. 6]

$$[i_{CNV\_P}^{dq0}] = [C^{dq0}][C^{\alpha\beta0}][i_{CNV\_P}^{rst}] \quad (10)$$

-continued $$[i_{CNV\_N}^{dq0}] = [C^{dq0}][C^{\alpha\beta0}][i_{CNV\_N}^{rst}] \quad (11)$$

The second PN-YZ converter 1211 performs the conversion into an rst phase system-side current value iCNV_Y^dq and an rst phase circulation current value iCNV_Z^dq on the basis of the rst phase current value iCNV_P^dq of the first arm and the rst phase current value iCNV_N^dq of the second arm using Expression (12) through the "PN-YZ conversion" described above.

[Math. 7]

$$\begin{bmatrix} i_{CNV\_Y}^{dq} \\ i_{CNV\_Z}^{dq} \end{bmatrix} = \begin{bmatrix} -1 & 1 \\ 1 & 1 \end{bmatrix} \begin{bmatrix} i_{CNV\_P}^{dq} \\ i_{CNV\_N}^{dq} \end{bmatrix} \quad (12)$$

In the foregoing Expression (12), the rst phase system-side current value iCNV_Y represents a system-side current and the rst phase circulation current value iCNV_Z represents a circulation current which circulates in the converter 2.

The system current ACR 1212 calculates an rst phase voltage command value vCNV_Y^dq*, for example, on the basis of the rst phase system-side current value iCNV_Y^dq, the inverter-side active power command value pM^*, a converter-side reactive power command value qS^* the capacitor voltage deviation amount ΔNCNV_DCZ^0, the system voltage detection value vS^dq, and the phase θCNV^rst. For example, the inverter-side active power command value pM^* and the converter-side reactive power command value qS^* are command values from the higher-level device. The details of the system current ACR 1212 will be described later.

The first circulation current control unit 1213 (hereinafter referred to as a "first circulation current ACR 1213") generates an rst phase voltage command value vCNV_Z^dq* on the basis of the current command value iCNV_Z^d*, the current command value iCNV_Z^dq*, and the rst phase circulation current value iCNV_Z^dq. The details of the first circulation current ACR 1213 will be described later.

The first YZ-PN converter 1214 performs reverse conversion of the "PN-YZ conversion" described above (refer to Expression (7)). This is referred to as "YZ-PN conversion." The first YZ-PN converter 1214 converts the rst phase voltage command value vCNV_Y^dq* and the rst phase voltage command value vCNV_Z^dq* into the rst phase voltage command value vCNV_P^dq* of the first arm and the rst phase voltage command value vCNV_N^dq* of the second arm through the YZ-PN conversion.

The first dq0 inverter 1215 performs the reverse conversion of the dq0 conversion (refer to Expression (9)) described above. This is referred to as "dq0 reverse conversion." The first dq0 inverter 1215 generates an rst phase voltage command value vCNV_P^rst* of the first arm on the basis of the rst phase voltage command value vCNV_P^dq* of the first arm and an rst phase voltage command value vCNV_P^0 of a zero phase component thereof through the dq0 reverse conversion. The first dq0 inverter 1215 generates an rst phase voltage command value vCNV_N^rst* of the second arm on the basis of the rst phase voltage command value vCNV_N^dq* of the second arm and an rst phase voltage command value vCNV_N^0 of a zero phase component thereof through the dq0 reverse conversion. Values of the rst phase voltage command value vCNV_P^0 and the rst phase voltage command value vCNV_N^0 described above may be set to 0 for simplicity. In addition, in order to use an overmodulation region, a 3n-order zero phase component of a fundamental wave may be used. The above "3n-order" indicates an order of a natural multiple of 3.

The CNV controller 1216 generates a gate pulse GPCNV for controlling each of the single-phase converter cells in the converter 2 on the basis of the rst phase voltage command value vCNV_P^rst* of the first arm and the rst phase voltage command value vCNV_N^rst* of the second arm. For example, the total number of single-phase converter cells in the converter 2 is 24 because two arms are provided for each phase of three-phase alternating currents and four single-phase converter cells are provided for each arm. If each of the single-phase converter cells is a full bridge type, each of the single-phase converter cells includes four switching elements. Thus, the total number of signals of the gate pulse is 96.

The details of control of the converter control unit 12 according to the embodiment will be described below.

The converter control unit 12 performs the following control using the above constitution:

Control to keep amounts of direct currents of all converter-side capacitor voltages constant; and
Converter-side low frequency pulsation power reduction control.

The above two controls using the converter control unit 12 will be sequentially described below.

The "control to keep amounts of direct currents of all converter-side capacitor voltages constant" mentioned first may be hierarchically divided into a plurality of controls (sub-controls) which will be described below and may be realized through a combination of the plurality of controls.

DC Voltage Bath Control:

The CNV controller 1216 performs control so that an arithmetic mean value of all converter-side capacitor voltages is a desired value by adjusting active power flowing in from the power supply side AC system 7.

Arm Balance Control:

The CNV controller 1216 controls a circulation current flowing in the converter 2 (a converter) so that an average value of a converter-side DC capacitor voltage of each arm is equal. This is referred to as "capacitor voltage balance control" and the details thereof will be described later.

Individual Balance Control:

The CNV controller 1216 may perform individual balance control at the time of balancing a converter-side DC capacitor voltage in each arm.

This individual balance control is control which does not interfere with the adjustment of an arm output voltage. The CNV controller 1216 can control independently without affecting the above-described "DC voltage bath control" and "arm balance control." For example, when the r-phase first arm outputs a voltage of 100% of a rated voltage, ratios of voltages (cell output voltages) output by four single-phase converter cells in the arm may evenly assigned (for example, 25%:25%:25%:25%). The present invention is not limited thereto and the ratios of the cell output voltages may be finely adjusted and assigned unevenly in accordance with a DC voltage. In this way, the control for individually adjusting a value assigned to each of the single-phase converter cells in the arm is "individual balance control." For example, with the above adjustment, the ratios of the cell output voltages can be assigned unevenly (for example, 20%:30%:25%:25%). At that time, a total value is set to be 100%. In order to simplify the description, in the following description, the description of the individual balance control is omitted. In addition, a case in which ratios of voltages output by the single-phase converter cells are equalized will be described.

The "capacitor voltage balance control" described above will be described below.

In the capacitor voltage balance control, for example, in order to stabilize a DC component of a capacitor voltage, an unbalanced component of the capacitor voltage may be separated and adjusted so that the unbalanced component is zero.

For example, the average voltage calculation unit 1201 in the converter charge state detection unit 1205 first performs LPF calculation on a detected value of the converter-side capacitor voltage, reduces a pulsation component depending on a basic frequency (fs) of an alternating current, and then calculates the deviation from the capacitor voltage command value vDC^*. Furthermore, the average voltage calculation unit 1201 calculates an arithmetic average in the arm with respect to the amount of deviation. One example thereof is as described above.

In the converter charge state detection unit 1205, the first $\alpha\beta 0$ converter 1202 performs the $\alpha\beta 0$ conversion on the calculation result of the average voltage calculation unit 1201 and the first PN-YZ converter 1203 performs the "PN-YZ conversion" on the calculation result of the average voltage calculation unit 1201. Thus, the converter charge state detection unit 1205 calculates a capacitor voltage deviation amount $\Delta vCNV\_DCY^\wedge \alpha\beta 0$ and a capacitor voltage deviation amount $\Delta vCNV\_DCZ^\wedge \alpha\beta 0$. The converter charge state detection unit 1205 supplies the capacitor voltage deviation amount $\Delta vCNV\_DCY^\wedge \alpha\beta 0$ and the capacitor voltage deviation amount $\Delta vCNV\_DCZ^\wedge \alpha\beta$ to the arm balance control 1204. They indicate DC voltage unbalance amounts between the arms. The converter charge state detection unit 1205 supplies the capacitor voltage deviation amount $\Delta vCNV\_DCZ^\wedge 0$ to the system current ACR 1212. The capacitor voltage deviation amount $\Delta vCNV\_DCZ^\wedge 0$ indicates a difference (an amount of deviation) between an average of all capacitor voltages and the capacitor voltage command value vDC^*.

The arm balance control unit 1204 calculates a command value of circulation current using the calculation result of the first PN-YZ converter 1203.

Also, the converter control unit 12 performs feedback control based on a detected value of a current flowing the arm. For example, the second $\alpha\beta 0$ converter 1210 performs the $\alpha\beta 0$ conversion on the detected value of the current flowing the arm and the second PN-YZ converter 1211 performs the "PN-YZ conversion" on the detected value of the current flowing the arm. The rst phase system-side current value iCNV_Y^dq of the calculation result of the second PN-YZ converter 1211 indicates a magnitude of a current on the power supply side AC system 7 side. The rst phase system-side current value iCNV_Z^dq indicates a circulation current flowing in the converter 2.

The system current ACR 1212 adjusts the system current iCNV_Y on the basis of the capacitor voltage deviation amount $\Delta vCNV\_DCZ^\wedge 0$ to exchange this excess/deficiency of power with the power source (this is referred to as "DC voltage bath control").

Figure 7:
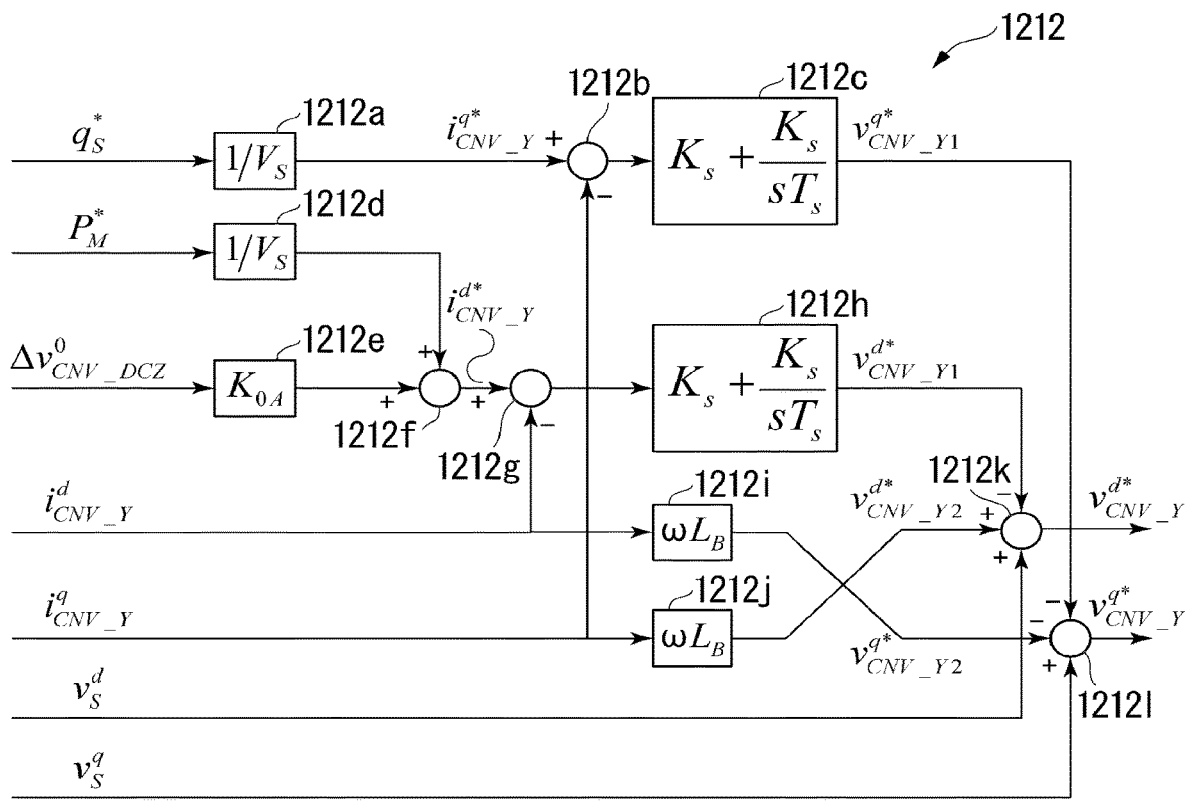
FIG. 7 is a constitution diagram of a system current ACR 1212 according to the embodiment.

The system current ACR 1212 associated with the "DC voltage bath control" in the embodiment will be described below. FIG. 7 is a constitution diagram of the system current ACR 1212 in the embodiment. The system current ACR 1212 includes calculation units 1212a to 1212l. VS indicates a line voltage effective value of the power supply side AC system 7. vS^dq indicates a system voltage detection value corresponding to a system voltage detection value vS^rst. In the case which will be described later, the system voltage detection value vS^dq is used for a feedforward term.

The calculation unit 1212a calculates a reactive current output command value iCNV_Y^q* by multiplying the converter-side reactive power command value qS^* by a predetermined coefficient "1/VS" based on the line voltage effective value of the power supply side AC system 7. The calculation unit 1212b subtracts the rst phase system-side current value iCNV_Y^q from the reactive current output command value iCNV_Y^q*. The calculation unit 1212c calculates a first q-axis system voltage command value vCNV_Y1^q* so that an amount of deviation of the rst phase system-side current value iCNV_Y^q with respect to the reactive current output command value iCNV_Y^q* is zero on the basis of the amount of deviation. For example, the calculation unit 1212c may calculate the first q-axis system voltage command value vCNV_Y1^q* by performing a proportionate integration calculation according to an arithmetic expression "KS+KS/sTS." The above "KS" is, for example, a predetermined proportional gain. The above "KS/TS" is, for example, a predetermined integral gain. The above "TS" is a predetermined calculation period and the denominator "s" in the arithmetic expression is a Laplace operator. "KSs" in a proportional gain and an integral gain may be different values.

The calculation unit 1212d calculates a reactive current output command value iCNV_Y^d* by multiplying the inverter-side active power command value pM^* by a predetermined coefficient "1/VS" as in the above. The calculation unit 1212e multiplies the capacitor voltage deviation amount ΔvCNV_DCZ^0 by a predetermined coefficient "K0A." The above "K0A" is, for example, a predetermined constant. The calculation unit 1212f calculates a reactive current output command value iCNV_Y^d* by adding the calculation result of the calculation unit 1212d to the calculation result of the calculation unit 1212e. The calculation unit 1212g subtracts the rst phase system-side current value iCNV_Y^d from the reactive current output command value iCNV_Y^d*. The calculation unit 1212h calculates a first d-axis system voltage command value vCNV_Y1^d* so that an amount of deviation of the rst phase system-side current value iCNV_Y^d with respect to the reactive current output command value iCNV_Y^d* is zero on the basis of the amount of deviation.

The calculation unit 1212i calculates a second q-axis system voltage command value vCNV_Y2^q* by multiplying the reactive current output command value iCNV_Y^d* by a predetermined coefficient "ωLB." The above "LB" is, for example, a reactance of the reactors 3119. The calculation unit 1212j calculates a second d-axis system voltage command value vCNV_Y2^d* by multiplying the reactive current output command value iCNV_Y^q* by a predetermined coefficient "ωLB." The above "LB" is, for example, a reactance of the reactor 3219 and a value thereof may be the same value as a reactance of the reactor 3119.

The calculation unit 1212k adds the second d-axis system voltage command value vCNV_Y2^d* to the system voltage detection value vS^d and subtracts the first d-axis system voltage command value vCNV_Y1^d* from the sum to calculate the resulting rst phase voltage command value vCNV_Y^d*. The calculation unit 1212l subtracts the first q-axis system voltage command value vCNV_Y1^q* and the second q-axis system voltage command value vCNV_Y2^q* from the system voltage detection value vS^q to calculate the resulting rst phase voltage command value vCNV_Y^q*.

The system current ACR 1212 exchanges power for excess/deficiency of all capacitor voltages with the power supply side AC system 7 using the above "system voltage bath control" to stabilize a DC component of the capacitor voltage.

The arm balance control unit 1204 associated with the "arm balance control" in the embodiment will be described below.

Figure 8:
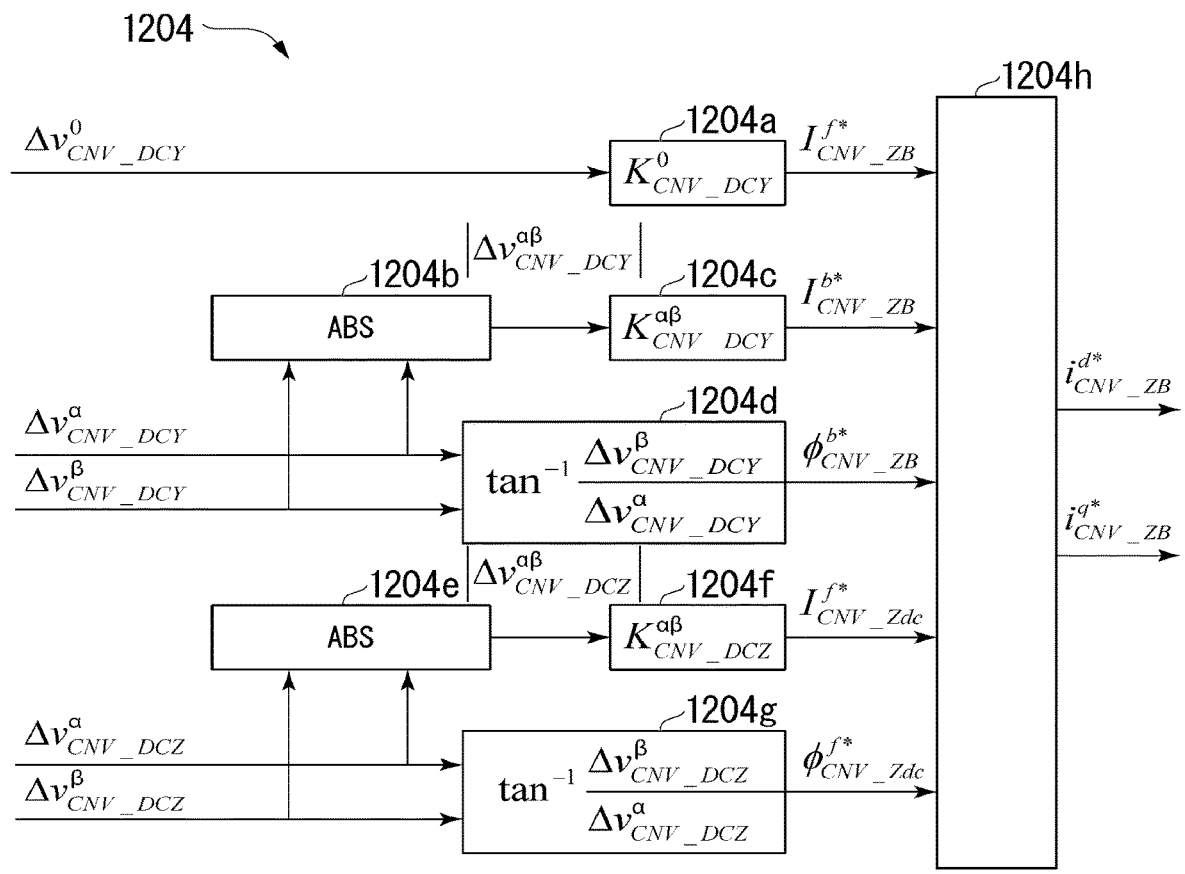
FIG. 8 is a constitution diagram of an arm balance control unit 1204 according to the embodiment.

FIG. 8 is a constitution diagram of the arm balance control unit 1204 in the embodiment. The arm balance control unit 1204 includes calculation units 1204a to 1204h.

The calculation unit 1204a calculates a first current command value iCNV_ZB^f* by multiplying the capacitor voltage deviation amount ΔvCNV_DCY^0 by a predetermined coefficient "KCNV_DCY^0."

The calculation unit 1204b calculates magnitude (an absolute value |ΔvCNV_DCY^αβ|) of the capacitor voltage deviation amount ΔvCNV_DCY^αβ. The calculation unit 1204c calculates a second current command value iCNV_ZB^b* by multiplying the absolute value |ΔvCNV_DCY^αβ| by a predetermined coefficient "KCNV_DCY^αβ." The calculation unit 1204d calculates a deviation angle ØCNV_ZB^b* based on the capacitor voltage deviation amount ΔvCNV_DCY^αβ using the following Expression (13).

[Math. 8]

$$\phi^{b*}_{CNV\_ZB} = \tan^{-1}\left(\frac{\Delta v^{\beta}_{CNV\_DCY}}{\Delta v^{\alpha}_{CNV\_DCY}}\right) \quad (13)$$

The calculation unit 1204e calculates a magnitude (an absolute value |ΔvCNV_DCZ^αβ|) of the capacitor voltage deviation amount ΔvCNV_DCZ^αβ. The calculation unit 1204f calculates a second current command value iCNV_Z^dc^b* by multiplying the absolute value |ΔvCNV_DCZ^αβ| by a predetermined coefficient "KCNV_DCZ^αβ." The calculation unit 1204g calculates a deviation angle ØCNV_Zdc^b* based on the capacitor voltage deviation amount ΔvCNV_DCZ^αβ using the following Expression (14).

[Math. 9]

$$\phi^{f*}_{CNV\_Zdc} = \tan^{-1}\left(\frac{\Delta v^{\beta}_{CNV\_DCZ}}{\Delta v^{\alpha}_{CNV\_DCY}}\right) \quad (14)$$

The calculation unit 1204h calculates a current command value iCNV_ZB^d* and a current command value iCNV_ZB^q* on the basis of the first current command value iCNV_ZB^f*, the second current command value iCNV_ZB^b*, the deviation angle ØCNV_ZB^b*, the second current command value iCNV_Z^dc^f*, and the deviation angle ØCNV_Zdc^f* described above using the following Expression (15).

[Math. 10]

$$\begin{bmatrix} i^{d*}_{CNV\_ZB} \\ i^{q*}_{CNV\_ZB} \end{bmatrix} = \sqrt{3}\, I^{f*}_{CNV\_ZB}\begin{bmatrix} 1 \\ 0 \end{bmatrix} + \sqrt{3}\, I^{b*}_{CNV\_ZB}\begin{bmatrix} -\cos(2\omega t + \phi^{b*}_{CNV\_ZB}) \\ \sin(2\omega t + \phi^{b*}_{CNV\_ZB}) \end{bmatrix} + \frac{\sqrt{3}}{2} I^{f*}_{CNV\_Zdc}\begin{bmatrix} \sin(\omega t - \phi^{f*}_{CNV\_Zdc}) \\ \cos(\omega t - \phi^{f*}_{CNV\_Zdc}) \end{bmatrix} \quad (15)$$

First to third terms of the foregoing Expression (15) correspond to positive and negative phases of a system frequency and a magnitude of a DC circulation current. It is possible to perform control so that a desired circulation current flows by adjusting these values.

The first low-frequency pulsation power reduction control unit 1217 and the first circulation current ACR 1213 associated with the circulation current control in the embodiment will be sequentially described.

Figure 9:
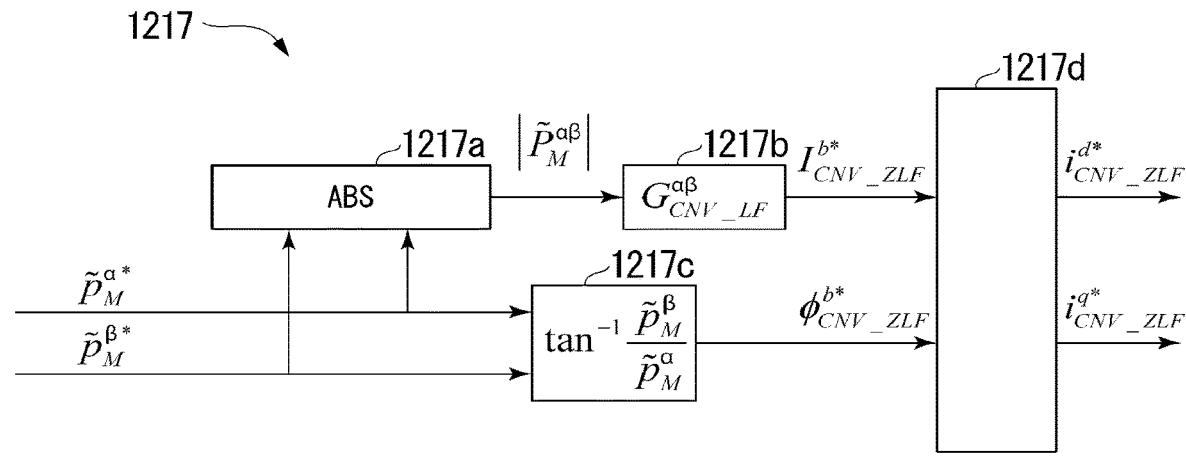
FIG. 9 is a constitution diagram of the first low-frequency pulsation power reduction control unit 1217 according to the embodiment.

FIG. 9 is a constitution diagram of the first low-frequency pulsation power reduction control unit 1217 in the embodiment. The first low-frequency pulsation power reduction control unit 1217 includes calculation units 1217a to 1217d.

The calculation unit 1217a calculates a magnitude (an absolute value |~pM^αβ*|) of a low-frequency pulsation component ~pM^αβ*. The calculation unit 1217b calculates a current command value ICNV_ZLF^b* by multiplying the absolute value |~pM^αβ*| by a conversion gain "GCNV_LF^αβ." The conversion gain "GCNV_LF^αβ" is an example of a conversion coefficient (a conversion rate) for converting power into a current. The calculation unit 1217c calculates a deviation angle ØCNV_ZLF^b* based on the low-frequency pulsation component ~pM^αβ* using the following Expression (16).

[Math. 11]

$$\phi_{CNV\_ZLF}^{d^*} = \tan^{-1}\left(\frac{\tilde{P}_M^{\beta^*}}{\tilde{P}_M^{\alpha^*}}\right) \quad (16)$$

The calculation unit 1217d calculates a current command value iCNV_ZLF^d* and a current command value iCNV_ZLF^q* on the basis of the current command value iCNV_ZLF^b* and the deviation angle ØCNV_ZLF^b* described above using the following Expression (17).

[Math. 12]

$$\begin{bmatrix} i_{CNV\_ZLF}^{d^*} \\ i_{CNV\_ZLF}^{q^*} \end{bmatrix} = \sqrt{3}\, I_{CNV\_ZLF}^{b^*} \begin{bmatrix} -\cos(2\omega t + \phi_{CNV\_ZLF}^{b^*}) \\ \sin(2\omega t + \phi_{CNV\_ZLF}^{b^*}) \end{bmatrix} \quad (17)$$

$$= \sqrt{3}\, |\tilde{P}_M^{\alpha\beta^*}|\, |G_{CNV\_LF}| \begin{bmatrix} -\cos(2\omega t + \phi_{CNV\_ZLF}^{b^*}) \\ \sin(2\omega t + \phi_{CNV\_ZLF}^{b^*}) \end{bmatrix}$$

The foregoing Expression (17) corresponds to an expression in which a reverse phase current component of the arm balance control is removed from the foregoing Expression (15). Here, the conversion gain "GCNV_LF" by which the absolute value |~pM^αβ*| is multiplied is different from a constant (a predetermined coefficient "KCNV_DCY^0") used by the calculation unit 1204a of the arm balance control unit 1204. The above constant in the arm balance control is defined as a control gain. On the other hand, the conversion gain "GCNV_LF" is defined as a gain for calculating how much a current is required from input pulsation power.

For example, normally, the conversion gain "GCNV_LF" may be set to a value in which all pulsation power is cancelled. When there is no margin in current capacity of the converter 2 and circulation power cannot be supplied enough to cancel all pulsation power, when "INV-side low frequency pulsation control" which will be described later is also used, and the like, the conversion gain "GCNV_LF" may be appropriately reduced or may be reduced in accordance with an operation state of the converter 2.

After that, the adder 1206 adds a current command value iCNV_ZB^dq* resulting from the arm balance control to a current command value iCNV_ZLF^dq* resulting from CNV-side low frequency pulsation reduction control and sets the added value as the final circulation current command value (a current command value iCNV_Z^dq*).

Figure 10:
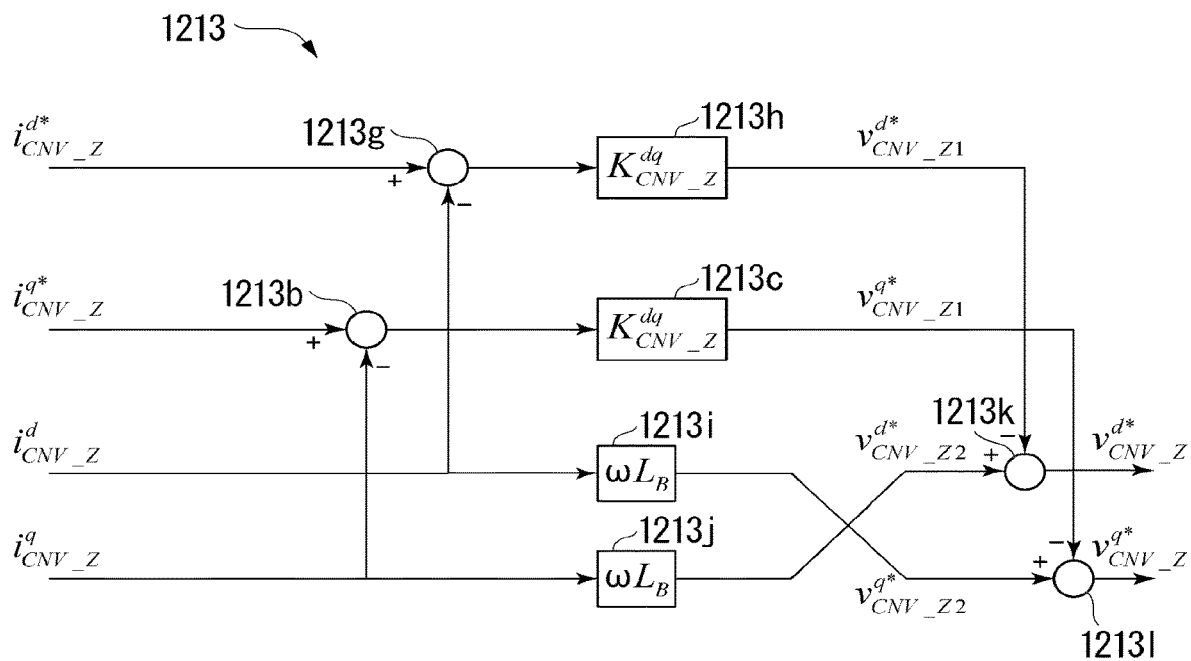
FIG. 10 is a constitution diagram of a first circulation current ACR 1213 according to the embodiment.

FIG. 10 is a constitution diagram of the first circulation current ACR 1213 in the embodiment. The first circulation current ACR 1213 includes calculation units 1213b, 1213c, and 1213g to 1213l.

The calculation unit 1213b subtracts the rst phase system-side current value iCNV_Z^q from the current command value iCNV_Z^q*. The calculation unit 1213c calculates a first q-axis system voltage command value vCNV_Z1^q* so that an amount of deviation of the rst phase system-side current value iCNV_Z^q with respect to the current command value iCNV_Z^q* is zero on the basis of the amount of deviation. For example, the calculation unit 1213c may calculate a first q-axis system voltage command value vCNV_Z1^q* by performing proportional calculation whose coefficient is defined by "KCNV_Z^dq."

The calculation unit 1213g subtracts the rst phase system-side current value iCNV_Z^d from the current command value iCNV_Z^d*. The calculation unit 1213h calculates a first d-axis system voltage command value vCNV_Z1^d* so that an amount of deviation of the rst phase system-side current value iCNV_Z^d with respect to the current command value iCNV_Z^d* is zero on the basis of the amount of deviation.

The calculation unit 1213i calculates a second q-axis system voltage command value vCNV_Z2^q* by multiplying the current command value iCNV_Z^d* by a predetermined coefficient "ωLB" The calculation unit 1213j calculates a second d-axis system voltage command value vCNV_Z2^d* by multiplying the current command value iCNV_Z^q* by a predetermined coefficient "ωLB."

The calculation unit 1213k subtracts the first d-axis system voltage command value vCNV_Z1^d* from the second d-axis system voltage command value vCNV_Z2^d* to calculate the resulting rst phase voltage command value vCNV_Z^d*. The calculation unit 1213l subtracts the first q-axis system voltage command value vCNV_Z1^q* from the second q-axis system voltage command value vCNV_Z2^q* to calculate the resulting rst phase voltage command value vCNV_Z^q*.

The rst phase voltage command value vCNV_Z^q* calculated using the first circulation current ACR 1213 is converted into a gate pulse GPCNV^rst using the first dq0 inverter 1215 and the CNV controller 1216 in the subsequent stage and each arm of the converter 2 is controlled using the gate pulse GPCNV^rst.

Through the above control, the converter control unit 12 can cause desired circulation current to flow inside the converter 2.

For example, the converter control unit 12 may control the converter 2 so that a fundamental wave reverse phase current with respect to a fundamental wave positive phase current associated with AC power of the power supply side AC system 7 flows as a first circulation current flowing through the first positive-side star connection line 210 and the first negative-side star connection line 220.

The converter control unit 12 may control the converter 2 so that active power of each phase of the power supply side AC system 7 is uniform.

The inverter control unit 13 in the embodiment will be described below.

Figure 11:
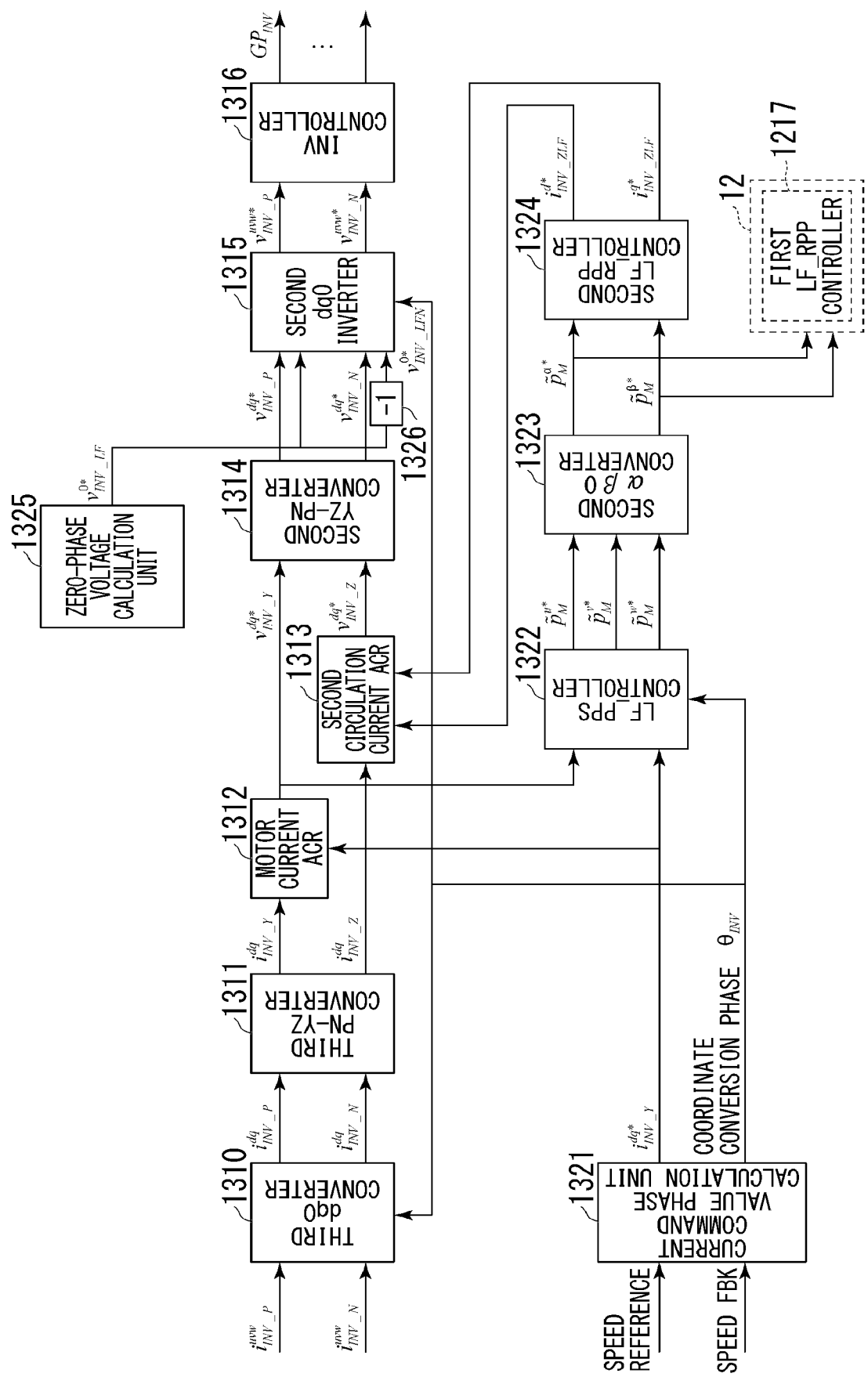
FIG. 11 is a constitution diagram of the inverter control unit 13 according to the embodiment.

FIG. 11 is a constitution diagram of the inverter control unit 13 in the embodiment.

The inverter control unit 13 includes a third dq0 converter 1310, a third PN-YZ converter 1311, a motor current ACR 1312, a second circulation current control unit 1313, a second YZ-PN converter 1314, a second dq0 inverter 1315, an INV controller 1316, an INV current command value phase calculation unit 1321, an LF_PPS controller 1322, a second αβ0 converter 1323, a second low frequency pulsation power reduction control unit 1324 (described as a "second LF_RPP control unit" in the drawing), a zero-phase voltage calculation unit 1325, and a multiplier 1326.

The third dq0 converter 1310 converts a uvw phase current value iINV_P^uvw of the first arm of the detected value and a uvw phase current value iINV_N^uvw of the second arm of each arm current of the inverter 3 into a uvw phase current value iINV_P^dq of the first arm and a uvw phase current value iINV_N^dq of the second arm through three-phase-dq0 conversion having a coordinate conversion phase θINV as a reference.

The third PN-YZ converter 1311 performs the PN-YZ conversion. The third PN-YZ converter 1311 performs the conversion into a uvw phase system-side current value iINV_Y^dq and a uvw phase circulation current value iINV_Z^dq on the basis of a uvw phase current value iINV_P^dq of the first arm and a uvw phase current value iINV_N^dq of the second arm. The uvw phase system-side current value iINV_Y represents a system-side current and the uvw phase circulation current value iINV_Z represents a circulation current circulating in the converter 2.

A motor current control unit 1312 (hereinafter referred to as a "motor ACR 1312") calculates a uvw phase voltage command value vINV_Y^dq* on the basis of a uvw phase system-side current value iINV_Y^dq and a motor current command value iINV_Y^dq*.

The motor current ACR 1312 includes, for example, calculation units 1312b, 1312c, and 1312g to 1312l. The calculation units 1312b, 1312c, and 1312g to 1312l correspond to 1212b, 1212c, and 1212g to 1212l of the system current ACR 1213. With the above correspondence, the details of the motor current ACR 1313 will be described with reference to the description associated with FIG. 7.

The second circulation current control unit 1313 (hereinafter referred to as "second circulation current ACR 1313") generates a uvw phase voltage command value vINV_Z^dq* on the basis of a current command value iINV_ZLF^dq* and a uvw phase circulation current value iINV_Z^dq.

The second circulation current ACR 1313 includes calculation units 1313b, 1313c, and 1313g to 1313l. The calculation units 1313b, 1313c, and 1313g to 1313l correspond to the calculation units 1213b, 1213c, and 1213g to 1213l of the first circulation current ACR 1213. With the above correspondence, the details of the second circulation current ACR 1313 will be described with reference to the description associated with FIG. 10.

The second YZ-PN converter 1314 performs the YZ-PN conversion to convert a uvw phase voltage command value vINV_Y^dq* and a uvw phase voltage command value vINV_Z^dq* into a uvw phase voltage command value vINV_P^dq* of the first arm and a uvw phase voltage command value vINV_N^dq* of the second arm.

The zero-phase voltage calculation unit 1325 generates a uvw phase voltage command value vINV_LF^0* which designates a zero-phase voltage output by the inverter 3 so that a "high-frequency zero-phase voltage" is superimposed on an AC voltage for the above-described "inverter-side low frequency pulsation power reduction control." When adjusting a magnitude (an amplitude) and a phase of a zero-phase voltage of the inverter 3, the zero-phase voltage calculation unit 1325 may set the magnitude (the amplitude) and the phase of the zero-phase voltage so that an output voltage of the inverter 3 is not saturated.

The multiplier 1326 calculates a uvw phase voltage command value vINV_LFN^0 with a negative value whose absolute value is equal to the uvw phase voltage command value vINV_LF^0* on the basis of a uvw phase voltage command value vINV_LF^0*.

The second dq0 inverter 1315 performs the dq0 reverse conversion having a coordinate conversion phase θINV as a reference on the basis of a uvw phase voltage command value vINV_P^dq* of the first arm and a uvw phase voltage command value vINV_LF^0* of the zero phase component to generate a uvw phase voltage command value vINV_P^uvw* of the first arm. The second dq0 inverter 1315 similarly performs the dq0 reverse conversion on the basis of a uvw phase voltage command value vINV_N^dq* of the second arm and a uvw phase voltage command value vINV_LFN^0* of the zero phase component to generate a uvw phase voltage command value vINV_N^uvw* of the second arm.

The INV controller 1316 generates a gate pulse GPINV configured to control each single-phase inverter cell in the inverter 3 on the basis of a uvw phase voltage command value vINV_P^uvw* of the first arm and a uvw phase voltage command value vINV_N^uvw* of the second arm. For example, a total number of single-phase inverter cells in the inverter 3 is 24 as in the converter 2. If each of the single-phase inverter cells is a full bridge type, a total number of signals of the gate pulse is 96 as in the converter 2.

The INV current command value phase calculation unit 1321, the LF_PPS controller 1322, the second αβ0 converter 1323, and the second low frequency pulsation power reduction control unit 1324 will be collectively described in the description of control.

The control of the inverter control unit 13 in the embodiment will be described below.

The INV current command value phase calculation unit 1321 calculates a dq-axis motor current command value iINV_Y^dq* and a coordinate conversion phase (θINV) on the basis of a speed FBK. For example, the INV current command value phase calculation unit 1321 may calculate a dq-axis motor current command value iINV_Y^dq* on the basis of a speed reference designated from a higher-level controller and an angular speed (referred to as a "speed FBK") of a motor M detected by a speed detector SS (FIG. 1) through a known technique such as vector control. For example, the INV current command value phase calculation unit 1321 integrates the speed FBK to calculate a coordinate conversion phase θINV.

Although the constitution illustrated in FIG. 11 is based on closed loop control having a current minor loop, open loop control may be applied. Vector control is an example of closed loop control and V/f control (voltage frequency ratio constant control) is an example of open loop control. Furthermore, although the speed control system using the speed detector is exemplified in the above constitution, sensorless control without using a speed detector (sensorless vector control) may be applied or torque control may be used instead of speed control.

The motor ACR 1312 calculates a uvw phase voltage command value vINV_Y^dq* on the basis of a uvw phase system-side current value iINV_Y^dq and a motor current command value iINV_Y^dq*. The second circulation current ACR 1313 generates a uvw phase voltage command value vINV_Z^dq* on the basis of a current command value iINV_ZLF^dq* and a uvw phase circulation current value iINV_Z^dq. The motor ACR 1312 and the second circulation current ACR 1313 performs current control with the components. The above Y component represents a drive current of the motor and the motor ACR 1312 performs current control to follow the motor current command value obtained in the above description.

The LF_PPS controller 1322 will be described below with reference to FIG. 12.

Figure 12:
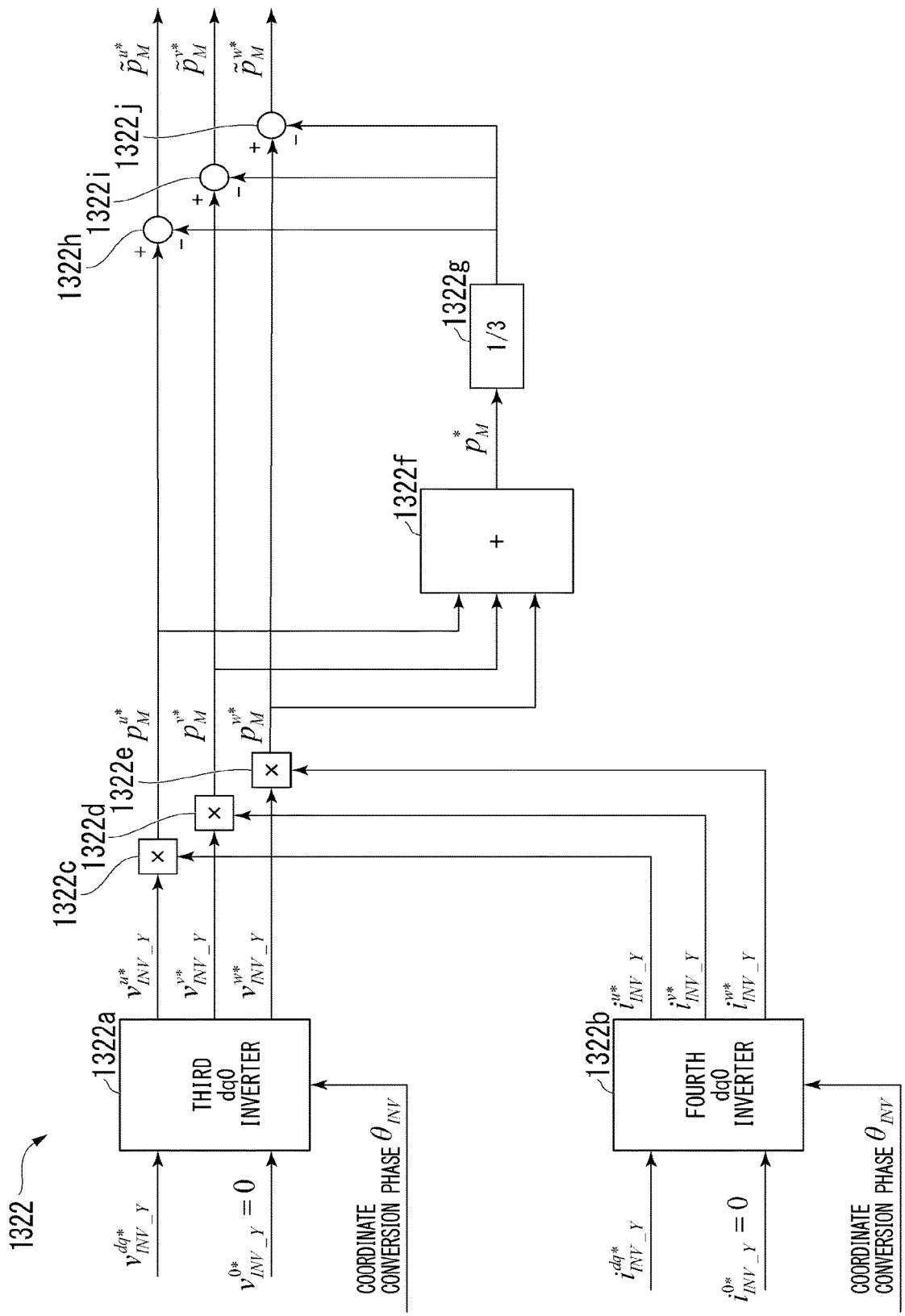
FIG. 12 is a constitution diagram of an LF_PPS controller 1322 according to the embodiment.

FIG. 12 is a constitution diagram of the LF_PPS controller 1322 in the embodiment. The LF_PPS controller 1322 calculates a low-frequency pulsation component (~pM^uvw*) included in power pM supplied to the motor M on the basis of a motor current command value iINV_Y^dq* and a uvw phase voltage command value vINV_Y^dq*.

For example, the LF_PPS controller 1322 includes a third dq0 inverter 1322a, a fourth dq0 inverter 1322b, and calculation units 1322c to 1322j.

The third dq0 inverter 1322a performs the dq0 reverse conversion using the coordinate conversion phase θINV as a reference and generates a Y component vINV_Y^uvw* of the uvw phase voltage command value on the basis of a Y component vINV_Y^dq* of a dq-axis uvw phase voltage command value and a Y component vINV_Y^0 of the uvw phase voltage command value of the zero phase component. A value of a uvw phase voltage command value vINV_Y^0 is 0.

The fourth dq0 inverter 1322b performs the dq0 reverse conversion using the coordinate conversion phase θINV as a reference and generates a Y component iINV_Y^uvw* of a uvw phase current command value on the basis of a Y component iINV_Y^dq* of a dq-axis uvw phase current command value and a Y component iINV_Y^0 of the uvw phase current command value of the zero phase component. A value of a uvw phase current command value iINV_Y^0 is 0.

The calculation units 1322c, 1322d, and 1322e are multipliers. The calculation units 1322c, 1322d, and 1322e calculates an instantaneous power command value pM^uvw* of a uvw phase by multiplying a Y component vINV_Y^uvw* with a uvw phase voltage command value by a Y component iINV_Y^uvw* with a uvw phase current command value for each component.

A calculation unit 1322f is an adder and adds each component of the instantaneous power command value pM^uvw* of the uvw phase. A total value of the instantaneous power command value pM^uvw* of the uvw phase is an active power command value pM^*. A calculation unit 1322g divides the active power command value pM^* by 3, distributes the quotient to each phase to obtain a reference value of the subsequent stage.

Calculation units 1322h, 1322i, and 1322j are subtractors and the reference value (the active power command value pM^*/3) distributed to each phase is subtracted from each component of the instantaneous power command value pM^uvw* of the uvw phase. The calculation results of the calculation units 1322h, 1322i, and 1322j are a low-frequency pulsation component (~pM^uvw*) included in each phase. Thus, the LF_PPS controller 1322 can separate a low-frequency pulsation component of a uvw phase for each phase.

Referring to FIG. 10 again, the second αβ0 converter 1323 provided in the subsequent stage of the LF_PPS controller 1322 will be described below.

The second αβ0 converter 1323 converts a low-frequency pulsation component (~pM^uvw*) of a uvw phase into a low-frequency pulsation component (~pM^αβ0*) of a fixed coordination system through the αβ0 conversion. The second αβ0 converter 1323 outputs the low-frequency pulsation component (~pM^αβ*) to the second low frequency pulsation power reduction control unit 1324 which will be described later and the first low-frequency pulsation power reduction control unit 1217 which will be described above. The second αβ0 converter 1323 may not output a zero phase component.

Incidentally, a basic frequency fM and a phase of second AC power output by the inverter 3 are different from a basic frequency fS and a phase of first AC power supplied to the converter 2. As described above, the second αβ0 converter 1323 represents a low-frequency pulsation component in the fixed coordination system through the αβ0 conversion. Thus, the converter 2 and the inverter 3 can share a value of the above-described low-frequency pulsation component as information concerning the fixed coordination system. The converter 2 and the inverter 3 perform control on the basis of the value of the low-frequency pulsation component of the fixed coordination system, thereby enabling control in cooperation with each other.

The control of a circulation current in the inverter 3 using the low-frequency pulsation component (~pM^αβ*) by the second low frequency pulsation power reduction control unit 1324 will be described below with reference to FIG. 11 described above.

The second low frequency pulsation power reduction control unit 1324 illustrated in FIG. 11 has a constitution different from that of the first low-frequency pulsation power reduction control unit 1217 illustrated in FIG. 7.

The second low frequency pulsation power reduction control unit 1324 generates a current command value iINV_ZLF^αβ* on the basis of a low-frequency pulsation component (~pM^αβ*).

For example, the second low frequency pulsation power reduction control unit 1324 multiplies the low-frequency pulsation component ~pM^αβ* by a conversion gain "GINV_LF^αβ" as in the converter 2 side using the following Expression (18) to calculate a current command value iINV_ZLF^αβ*. The conversion gain "GINV_LF^αβ" is an example of a conversion coefficient (a conversion rate) for converting power into a current.

[Math. 13]

$$\begin{bmatrix} I_{INV\_ZLF}^{\alpha*} \\ I_{INV\_ZLF}^{\beta*} \end{bmatrix} = G_{INV\_LF} \begin{bmatrix} \tilde{p}_M^{\alpha*} \\ \tilde{p}_M^{\beta*} \end{bmatrix} \quad (18)$$

As described on the CNV side, the control unit 10 can set a ratio of the conversion gain "GCNV_LF^αβ" and a conversion gain "GINV_LF^αβ" to an appropriate value in advance or adaptively in accordance with an operation state of the power conversion device 1 to optimize the effect of reducing the low frequency pulsation power. The above ratio may be determined accordingly.

The second low frequency pulsation power reduction control unit 1324 performs the αβ0 reverse conversion on the current command value IINV_ZLF^αβ* of the circulation current obtained above to generate a current command value IINV_ZLF^uvw* of a uvw phase. At this time, a value of a zero phase is set to zero.

Subsequently, the second low frequency pulsation power reduction control unit 1324 calculates a current command value iINV_ZLF^uvw* on the basis of a current command value IINV_ZLF^uvw* using the following Expression (19).

[Math. 14]

$$\begin{bmatrix} i_{INV\_LF}^{u*} \\ i_{INV\_LF}^{v*} \\ i_{INV\_LF}^{w*} \end{bmatrix} = \sqrt{2}\sin(\omega_X t + \phi_X^0) \begin{bmatrix} I_{INV\_LF}^{u*} \\ I_{INV\_LF}^{v*} \\ I_{INV\_LF}^{w*} \end{bmatrix} \quad (19)$$

Subsequently, the second low frequency pulsation power reduction control unit 1324 performs the dq conversion on the current command value iINV_ZLF^uvw* to calculate a current command value iINV_ZLF^dq*.

The second circulation current ACR 1313 generates a uvw phase voltage command value vINV_Z^dq* on the basis of the current command value iINV_ZLF^dq* calculated through the second low frequency pulsation power reduction control unit 1324 using the same method as the above-described first circulation current ACR 1213.

The subsequent processes using the second dq0 inverter 1315 and the INV controller 1316 are as described above.

The zero-phase voltage calculation unit 1325 may generate a uvw phase voltage command value vINV_LF^0* using the following Expression (20).

[Math. 15]

$$v_{INV\_LF}^{0*}\sqrt{2}V_X^{0*}\sin(\omega_X t + \phi_X^0) \quad (20)$$

Here, a frequency component higher than that of a fundamental wave frequency fM (hereinafter referred to as "fX") is prescribed. "X" in the foregoing Expression (20) is an identifier used for identifying the above frequency component fX. "VX^0*" is obtained by prescribing a command value of a zero-phase voltage of the frequency component fX using an effective value. Similarly, "ωX" and "ØX^0" represent an angular speed of the frequency component fX and a phase of the zero-phase voltage.

As described above, the inverter 3 determines a circulation current in the converter 2 using the low-frequency pulsation component ~pM^αβ* and the conversion gain "GINV_LF^αβ" which converts power into a current, as in the converter 2 side.

The conversion gain "GINV_LF^αβ" shown in the foregoing Expression (20) is used for controlling a zero-phase current as in the above-described conversion gain "GCNV_LF^αβ" of the first circulation current ACR 1213, but may be a value different from the conversion gain "GCNV_LF".

For example, a storage unit of the control unit 10 has an assigned region in which the conversion gain "GCNV_LF^αβ" and the conversion gain "GINV_LF^αβ" are stored and data defining these is stored in the region in advance. The converter control unit 12 adjusts a magnitude (an amplitude) of a component of a zero-phase voltage on the converter 2 side using the conversion gain "GCNV_LF^αβ." The inverter control unit 13 adjusts a magnitude (an amplitude) of a component of a zero-phase voltage on the inverter 3 side using the conversion gain "GINV_LF^αβ." Thus, the converter 2 and the inverter 3 can independently determine a magnitude (an amplitude) of a component of each zero-phase voltage using the conversion gain "GCNV_LF^αβ" and the conversion gain "GINV_LF^αβ."

The control unit 10 can set a ratio of the conversion gain "GCNV_LF^αβ" and the conversion gain "GINV_LF^αβ" to an appropriate value in advance or adaptively in accordance with an operation state of the power conversion device 1 to optimize the effects of reducing a low frequency pulsation power. The conversion gain "GCNV_LF^αβ" and the conversion gain "GINV_LF^αβ" described above are examples of conversion rates.

As described above, the conversion gain "GCNV_LF^αβ" and the conversion gain "GINV_LF^αβ" are used, the inverter 3 superimposes a zero-phase voltage of the frequency component fX on the basis of the conversion gain "GINV_LF^αβ" and reduces pulsation power derived from the fundamental wave frequency fM by causing a circulation current with the same frequency to flow in the inverter 3. In addition to this, the converter 2 superimposes the zero-phase voltage of the frequency component fX on the basis of the conversion gain "GCNV_LF^αβ" and reduces pulsation power derived from the fundamental wave frequency fM by causing a circulation current with the same frequency to flow in the converter 2.

In this case, the converter 2 and the inverter 3 may utilize sine waves of the frequency component fX or square waves of the frequency component fX for a component of each zero-phase voltage.

According to the power conversion device 1 in the above-described embodiment, the converter 2 (the first power converter) includes the converter first arm, the converter second arm, the first positive-side star connection line 210 configured to connect the converter first arm in a star shape, the first negative-side star connection line 220 configured to connect the converter second arm in a star shape, and the first AC connection terminals 201, 202, and 203 (first terminals) configured to connect the first positive-side star connection line 210 and the first negative-side star connection line 220 to each phase of the power supply side AC system 7. In addition, the converter first arm and the converter second arm mutually convert the first AC power and the first DC power of the power supply side AC system 7. The plurality of insulation type DCDC converter devices 4000 mutually convert the first DC power and the second DC power. The inverter 3 (the second power converter) includes the inverter first arm, the inverter second arm, the second positive-side star connection line 310 configured to connect the inverter first arm in a star shape, the second negative-side star connection line 320 configured to connect the inverter second arm in a star shape, and the second AC connection terminals 301, 302, and 303 (second terminals) configured to connect the second positive-side star connection line 310 and the second negative-side star connection line 320 to each phase of the load-side AC system 8. In addition, the inverter first arm and the inverter second arm mutually convert the second DC power and the second AC power.

When the first positive-side star connection line 210 and the first negative-side star connection line 220 are connected to the power supply side AC system 7 and the second positive-side star connection line 310 and the second negative-side star connection line 320 are connected to the load-side AC system 8 in such a power conversion device 1, the converter 2 and the inverter 3 reduce the imbalance between the phases of the active power to be supplied to the load side of the power conversion device. Thus, it is possible to reduce an influence of the imbalance between the phases of the active power of the above-described load-side AC system 8 on the power supply side AC system 7.

In the case of the above constitution, the converter first arm and the converter second arm of the converter 2 are connected in a so-called double star shape through the converter star connection line. The inverter first arm and the inverter second arm of the inverter 3 are connected in a so-called double star shape through the inverter star connection line. In this case, since a voltage applied to each phase is lower than that in the case in which the converter 2 is connected through a delta connection line, the number of single-phase converter cells of each phase is smaller than that in the case of a delta connection line. The same applies to a case in which the inverter 3 is connected to the load-side AC system 8.

The converter control unit 12 may control the converter 2 so that a first circulation current including a fundamental wave reverse phase current associated with the power supply side AC system 7 as a component is caused to flow through the first positive-side star connection line 210 and the first negative-side star connection line 220. In this case, the converter 2 can cause a first circulation current whose amount of current is adjusted on the basis of the rst phase voltage command value vCNV_Z^dq* generated using the first circulation current ACR 1213 to flow.

In the above case, the inverter control unit 13 may control the inverter 3 by adjusting a second circulation current flowing through the second positive-side star connection line 310 and the second negative-side star connection line 320. In this case, the inverter 3 can cause a second circulation current whose amount of current is adjusted on the basis of the uvw phase voltage command value vINV_Z^dq* generated using the second circulation current ACR 1313.

Also, the converter control unit 12 and the inverter control unit 13 may calculate the amount of first circulation current to be adjusted and the amount of second circulation current to be adjusted on the basis of a state amount of the inverter 3. For example, the speed FBK is an example of the state amount of the inverter 3.

The converter control unit 12 in the control unit 10 (the power conversion control device) controls the converter 2 to cause a fundamental wave reverse phase current to flow with respect to a fundamental wave positive phase current associated with the first AC power as the first circulation current flowing through the first positive-side star connection line 210 and the first negative-side star connection line 220. The inverter control unit 13 performs control so that a second circulation current is caused to flow through the second positive-side star connection line 310 and the second negative-side star connection line 320. At that time, the converter control unit 12 and the inverter control unit 13 may independently control the first circulation current and the second circulation current using a predetermined coefficient. Thus, it is possible to reduce an amount of adjustment using the converter control unit 12 and the inverter control unit 13.

Modified Examples

Some modified examples will be described below.

In a first modified example, an inverter control unit 13 may detect a low-frequency pulsation component of power (second DC power) of a second single-phase full bridge circuit on a DC side in an inverter 3 as a state amount of the inverter 3 and the converter control unit 12 may adjust a first circulation current in the converter 2 on the basis of a low-frequency pulsation component of the power of the second single-phase full bridge circuit on the DC side. Thus, when the low-frequency pulsation component of the power of the second single-phase full bridge circuit on the DC side is generated, the converter 2 side can reduce an influence of the low-frequency pulsation component of the power of the second single-phase full bridge circuit on the DC side by causing a the first circulation current to flow in the converter 2.

In a second modified example, an inverter control unit 13 may adjust a second circulation current in an inverter 3 so that a low-frequency pulsation component of a DC voltage of the above-described second DC power is reduced on the basis of the low-frequency pulsation component of the DC voltage of the second DC power. Thus, when a low-frequency pulsation component of power of a second single-phase full bridge circuit on a DC side is generated, it is possible to reduce an influence of the low-frequency pulsation component of the power of the second single-phase full bridge circuit on the DC side by causing a first circulation current to flow in the converter 2 so that the influence does not affect the converter 2 side.

In a third modified example, a first capacitor is provided in each of a plurality of single-phase converter cells in a converter 2. The converter control unit 12 may adjust the first circulation current of the opposite phase of a fundamental wave of the first AC power so that an amount of direct currents of a voltage of the first capacitor of each of the plurality of single-phase converter cells is kept constant on the basis of the amount of direct currents of the voltage of the first capacitor provided in each of the plurality of single-phase converter cells and a low-frequency pulsation component of a DC voltage of second DC power of a negative phase of fundamental waves of first AC power.

The above-described control unit 10 includes, for example, a storage unit (not shown), a central processing unit (CPU), a drive unit, and an acquisition unit. The storage unit, the CPU, the drive unit, and the acquisition unit are connected in a control unit via, for example, a BUS. The storage unit includes a semiconductor memory. The CPU includes a processor configured to execute a desired process in accordance with a software program. The drive unit generates a control signal for each unit of the power conversion device 1 in accordance with the control of the CPU. The acquisition unit acquires the detection results of each current sensor and each voltage sensor. For example, the CPU of the control unit 10 controls a main circuit of each phase using the drive unit on the basis of the detection results of the current sensor and the voltage sensor acquired using the acquisition unit. The control unit 10 may be realized using a part or all of the process through a process of the software program as described above or may be realized using hardware instead of this. Furthermore, the control unit 10 may be appropriately divided and configured to ensure insulating properties of a circuit.

Although some embodiments of the present invention have been described, the embodiments are presented as examples and are not intended to limit the scope of the present invention. The embodiments can be implemented in various other forms and various omissions, replacements, and changes are possible without departing from the gist of the present invention. The embodiments and modifications thereof are included in the invention described in the claims and the equivalents thereof as well as included in the scope and the gist of the present invention.

Although a case in which a 2-level single-phase self-exciting converter is provided as each of the single-phase full bridge circuits of the DCDC converter device 4000, each of the single-phase converter cells, and each of the single-phase inverter cells has been exemplified in the above description of the embodiments, each of the single-phase full bridge circuits of the DCDC converter device 4000, each of the single-phase converter cells, and each of the single-phase inverter cells are not limited thereto and may be a single-phase self-exciting converter of any level of 3-levels or hither. In this case, capacitors may be provided as many as the number of levels.

REFERENCE SIGNS LIST

1 Power conversion device
2 Converter (first power converter)
3 Inverter (second power converter)
4 DCDC converter group
5 Converter-side capacitor group
6 Inverter-side capacitor group
7 Power supply side AC system
8 Load-side AC system
10 Control unit
12 Converter control unit
13 Inverter control unit
210 First positive-side star connection line
220 First negative-side star connection line
201, 202, 203 First AC connection terminal
2110 R-phase first arm
2120 S-phase first arm
2130 T-phase first arm
2210 R-phase second arm
2220 S-phase second arm
2230 T-phase second arm
310 Second positive-side star connection line
320 Second negative-side star connection line
301, 302, 303 Second AC connection terminal
3110 U-phase first arm
3120 V-phase first arm
3130 W-phase first arm
3210 U-phase second arm
3220 V-phase second arm
3230 W-phase second arm
2111 to 2114, 2215 to 2218 Single-phase converter cell
3111 to 3114, 3215 to 3218 Single-phase inverter cell
4111 to 4114, 4215 to 4218, 4000 DCDC converter device
5111 to 5114, 5215 to 5218 Capacitor (first capacitor)

The invention claimed is:

1. A power conversion device, comprising:
a first power converter which includes a plurality of first positive-side arms, a plurality of first negative-side arms, a first positive-side star connection line configured to connect the plurality of first positive-side arms in a star shape, a first negative-side star connection line configured to connect the plurality of first negative-side arms in a star shape, and a first terminal configured to connect the first positive-side star connection line and the first negative-side star connection line to each phase of a power supply side alternating current (AC) system and in which the plurality of first positive-side arms and the plurality of first negative-side arms mutually convert first AC power and first direct current (DC) power of the power supply side AC system;
a plurality of insulation type DCDC converter devices configured to mutually convert bidirectionally between the first DC power to a second DC power; and
a second power converter which includes a plurality of second positive-side arms, a plurality of second negative-side arms, a second positive-side star connection line configured to connect the plurality of second positive-side arms in a star shape, a second negative-side star connection line configured to connect the plurality of second negative-side arms in a star shape, and a second terminal configured to connect the second positive-side star connection line and the second negative-side star connection line to each phase of a load-side AC system to provide a second AC power and in which the plurality of second positive-side arms and the plurality of second negative-side arms mutually convert the second DC power and the second AC power.

2. The power conversion device according to claim 1, wherein the plurality of DCDC converter devices are connected to the first power converter and the second power converter, insulate between the first power converter and the second power converter, and mutually convert power between the first power converter and the second power converter, and
one DCDC converter device of the plurality of DCDC converter devices is connected to a first capacitor provided in association with one single-phase converter cell of the plurality of single-phase converter cells and a second capacitor provided in association with one single-phase inverter cell of the plurality of single-phase inverter cells.

3. The power conversion device according to claim 2, wherein the one single-phase converter cell mutually converts a part of the first AC power and a part of the first DC power,
the one DCDC converter device mutually converts a part of the first DC power and a part of the second DC power, and
the one single-phase inverter cell mutually converts a part of the second DC power and a part of the second AC power.

4. The power conversion device according to claim 1, further comprising:
a first control unit configured to control the first power converter so that a fundamental wave reverse phase current with respect to a fundamental wave positive phase current associated with the first AC power flows as a first circulation current flowing through the first positive-side star connection line and the first negative-side star connection line.

5. The power conversion device according to claim 1, further comprising:
a first control unit configured to control the first power converter so that active power of each phase of the first AC power is uniform.

6. The power conversion device according to claim 1, further comprising:
a second control unit configured to control the second power converter by adjusting a second circulation current flowing through the second positive-side star connection line and the second negative-side star connection line.

7. The power conversion device according to claim 1, comprising:
a first control unit configured to control the first power converter so that a first circulation current including a fundamental wave reverse phase current associated with the first AC power as a component flows through the first positive-side star connection line and the first negative-side star connection line; and
a second control unit configured to control the second power converter by adjusting a second circulation current flowing through the second positive-side star connection line and the second negative-side star connection line, wherein the first control unit and the second control unit calculate an amount of adjustment of the first circulation current and an amount of adjustment of the second circulation current on the basis of a state amount indicating a state of the second power converter.

8. The power conversion device according to claim 7, wherein the second control unit detects a low-frequency pulsation component of the second DC power as a state amount of the second power converter, and the first control unit adjusts the first circulation current on the basis of the low-frequency pulsation component of the second DC power.

9. The power conversion device according to claim 7, wherein the second control unit adjusts the second circulation current on the basis of the low-frequency pulsation component of the second DC power so that the low-frequency pulsation component of the second DC power is reduced.

10. The power conversion device according to claim 7, wherein each of the plurality of first positive-side arms includes a plurality of single-phase converter cells connected in a cascade manner, each of the plurality of second positive-side arms includes a plurality of single-phase inverter cells connected in a cascade manner, a first capacitor is provided in each of the plurality of single-phase converter cells, and the first control unit adjusts the first circulation current so that an amount of direct currents of a voltage of the first capacitor provided in each of the plurality of single-phase converter cells is kept constant on the basis of the amount of the direct currents of the voltage of the first capacitor provided in each of the plurality of single-phase converter cells and the low-frequency pulsation component of the DC voltage of the second DC power.

11. A power conversion control device which controls the power conversion device according to claim 1, comprising:

a first control unit configured to control the first power converter so that a fundamental wave reverse phase current with respect to a fundamental wave positive phase current associated with the first AC power is caused to flow as a first circulation current flowing through the first positive-side star connection line and the first negative-side star connection line; and a second control unit configured to perform control so that a second circulation current is caused to flow through the second positive-side star connection line and the second negative-side star connection line, wherein the first control unit and the second control unit control magnitudes of the first circulation current and the second circulation current on the basis of a conversion rate which prescribes the magnitudes of the first circulation current and the second circulation current.

12. A power conversion device, comprising:

a first power converter including a plurality of single-phase converter cells connected in a cascade manner;

a second power converter including a plurality of single-phase inverter cells connected in a cascade manner; and a plurality of insulation type DCDC converter devices connected to the first power converter and the second power converter and configured to bidirectionally convert power, wherein a first DCDC converter device of the plurality of DCDC converter devices is connected to a first single-phase converter cell of the plurality of single-phase converter cells and a first single-phase inverter cell of the plurality of single-phase inverter cells, and a second DCDC converter device of the plurality of DCDC converter devices is connected to a second single-phase converter cell of the plurality of single-phase converter cells and a second single-phase inverter cell of the plurality of single-phase inverter cells.

13. The power conversion device according to claim 12, wherein the first DCDC converter device and the second DCDC converter device are connected via the first single-phase converter cell and the second single-phase converter cell.

14. The power conversion device according to claim 12, wherein the first DCDC converter device and the second DCDC converter device are connected via the first single-phase inverter cell and the second single-phase inverter cell.

15. The power conversion device according to claim 12, wherein a second capacitor is provided in each of the plurality of single-phase inverter cells in association with the plurality of single-phase inverter cells, and the first DCDC converter device controls conversion to be performed on DC power so that an instantaneous value of a voltage of the second capacitor becomes constant.

16. A power conversion device, comprising:

a first power converter in which a plurality of single-phase converter cells are provided in each phase of a power supply side AC system and which includes a first positive-side star connection line and a first negative-side star connection line configured to connect AC sides of the plurality of single-phase converter cells in series for each phase of the power supply side AC system;

a second power converter in which a plurality of single-phase inverter cells are provided in each phase of a load-side AC system and which includes a second positive-side star connection line and a second negative-side star connection line configured to connect AC sides of the plurality of single-phase inverter cells in series for each phase of the load-side AC system; and a plurality of DCDC converter devices which insulate between the DC sides of the plurality of single-phase converter cells and the DC sides of the plurality of single-phase inverter cells and connect a DC side of one single-phase converter cell of the plurality of single-phase converter cells to a DC side of a single-phase inverter cell of the plurality of single-phase inverter cells corresponding to the one single-phase converter cell.

17. The power conversion device according to claim 16, wherein each of the plurality of DCDC converter devices propagates a low frequency pulsation power generated on the second power converter side toward the first power converter side.

18. The power conversion device according to claim 17, comprising:

a control unit controlling the first power converter and the second power converter so that the imbalance of active power generated in each phase of the load-side AC system to which the second power converter is connected does not affect the imbalance of active power of each phase of the power supply side AC system to which the first power converter is connected.

* * * * *